(12) United States Patent
Aoyama et al.

(10) Patent No.: US 7,550,893 B2
(45) Date of Patent: Jun. 23, 2009

(54) ARMATURE, METHOD FOR MANUFACTURING THE ARMATURE, AND DIRECT CURRENT MOTOR

(75) Inventors: Tomohiro Aoyama, Kosai (JP); Yasuhide Ito, Hamamatsu (JP); Yoshiki Nakano, Hamamatsu (JP)

(73) Assignee: ASMO Co., Ltd., Shizuoka-ken (JP)

( * ) Notice: Subject to any disclaimer, the term of this patent is extended or adjusted under 35 U.S.C. 154(b) by 489 days.

(21) Appl. No.: 11/338,609

(22) Filed: Jan. 23, 2006

(65) Prior Publication Data
US 2006/0208605 A1 Sep. 21, 2006

(30) Foreign Application Priority Data
Jan. 24, 2005 (JP) ............................. 2005-016044
Feb. 23, 2005 (JP) ............................. 2005-047764

(51) Int. Cl.
*H02K 1/22* (2006.01)
(52) U.S. Cl. ....................... 310/264; 310/233
(58) Field of Classification Search ............. 310/233, 310/71, 264, 179
See application file for complete search history.

(56) References Cited

U.S. PATENT DOCUMENTS 6,756,717 B2 * 6/2004 Yamamoto et al. .......... 310/225

2004/0095036 A1   5/2004 Yamamoto et al. .......... 310/233
2007/0257572 A1 * 11/2007 Nakano et al. ............ 310/68 D

FOREIGN PATENT DOCUMENTS

| JP | 10-155258   | * | 6/1998  |
| JP | 2003-153501 | * | 5/2003  |
| JP | 2003-299292 |   | 10/2003 |
| JP | 2004-088902 |   | 3/2004  |
| JP | 2004-088916 |   | 3/2004  |

* cited by examiner

*Primary Examiner*—Nguyen N Hanh
(74) *Attorney, Agent, or Firm*—Marsh Fischmann & Breyfogle LLP

(57) ABSTRACT

Coils are provided on a plurality of tooth sections of a core. The coils are formed by successively winding a conductor on the tooth sections with at least one tooth section between each successive windings, such that each portion of the conductor extending between two tooth sections located with at least one tooth section therebetween forms a jumper wire extending in the circumferential direction of the core. A commutator has a plurality of claw portions projecting to the outside of the commutator. Each of the claw portions electrically connects one of a plurality of segments to one of the jumper wires. When the core and the commutator are attached to a rotary shaft, each claw portion is arranged at a position corresponding to one of the jumper wires as viewed in the axial direction of the rotary shaft.

12 Claims, 18 Drawing Sheets

ARMATURE, METHOD FOR MANUFACTURING THE ARMATURE, AND DIRECT CURRENT MOTOR

BACKGROUND OF THE INVENTION

The present invention relates to an armature and a manufacturing method therefore, and a DC motor.

A general DC motor with brushes is provided with a plurality of coils wound on a core and a commutator having a plurality of segments connected electrically to these coils, and the core and the commutator are fixed on a rotary shaft so as to be arranged along the axis of the rotary shaft. In a DC motor disclosed, for example, in Japanese Laid-Open Patent Publication No. 2003-299292, the end portion of a conductor forming the coil is engaged with a claw portion provided on a segment, and thereby the coil is connected electrically to the segment.

For the DC motor described in the above publication, a step is required in which after the coils have been wound on the core, the end portion of the conductor forming each coil is moved to the position of the claw portion of segment and is engaged to the claw portion. This requirement increases the number of steps for manufacturing the DC motor. Also, in order to enable the work for engaging the end portion of the conductor to the claw portion to perform smoothly, the core on which the coils are wound is arranged so as to be separate by a predetermined distance in the axial direction from the commutator. However, this configuration increases the size in the axial direction of the DC motor.

On the other hand, in a DC motor disclosed in Japanese Laid-Open Patent Publication No. 2004-88902, a columnar recess is formed in the core, and a part of the commutator is accommodated in this recess. Therefore, the size in the axial direction of the DC motor can be decreased. In the case where such a configuration is adopted, however, it seems that a winding step for winding the coils on the core and a joining step for joining the coils to the commutator need to be performed in the state in which the core and the commutator are mounted on the rotary shaft so that the axial positional relationship that does not hinder the winding step and the joining step, and subsequently, the commutator needs to be moved in the axial direction with respect to the rotary shaft so that the axial positional relationship of the core and the commutator becomes the positional relationship at the time of completion of motor. That is to say, it seems that it is necessary to perform a step in which the commutator is moved in the axial direction with respect to the rotary shaft at least a total of two times before and after the winding step and the joining step. Therefore, the number of steps for manufacturing the DC motor increases inevitably. Also, if the commutator is moved in the axial direction with respect to the rotary shaft after the joining step, there is a possibility of deforming or damaging the joint portion between the coil and the claw portion, thereby decreasing the reliability of the joint portion.

SUMMARY OF THE INVENTION

An objective of the present invention is to provide an armature capable of restraining an increase in the number of manufacturing steps, a manufacturing method for the armature, and a DC motor.

To achieve the above object, an armature in accordance with the present invention includes a rotary shaft, a core, a plurality of coils, and a commutator. The core fixed on the rotary shaft has a body section and a plurality of tooth sections extending from the body section to the outside in the radial direction and arranged along the circumferential direction of the body section. Each of the coils is provided around one of the tooth sections. The coils are formed by successively winding a conductor on the tooth sections with at least one tooth section between each successive windings, such that each portion of the conductor extending between two tooth sections located with at least one tooth section therebetween forms a jumper wire extending in the circumferential direction of the core. The commutator fixed on the rotary shaft has a plurality of segments arranged along the circumferential direction of the commutator and a plurality of connecting members projecting to the outside in the radial direction of the commutator. Each connecting member electrically connects one of the segments to one of the jumper wires. When the core and the commutator are attached to the rotary shaft, each connecting member is arranged at a position corresponding to one of the jumper wires as viewed in an axial direction of the rotary shaft.

The present invention also provides a DC motor including a rotary shaft, a core, a plurality of coils, a commutator, a short-circuit member assembly, and a magnetic pole body. The core fixed on the rotary shaft has a body section and eight tooth sections extending from the body section to the outside in the radial direction and arranged along the circumferential direction of the body section. Each of the coils is provided around one of the tooth sections. The coils are formed by successively winding a conductor on the tooth sections with two tooth sections between each successive windings, such that each portion of the conductor extending between two tooth sections located with two tooth sections therebetween forms a jumper wire extending in the circumferential direction of the core. The commutator fixed on the rotary shaft has twenty-four segments arranged at equal angular intervals along the circumferential direction of the commutator and a plurality of connecting members projecting to the outside in the radial direction of the commutator and arranged at equal angular intervals along the circumferential direction of the commutator. The segments are divided into a plurality of segment groups, and each of the segment groups includes three segments arranged at 120° intervals. Each connecting member corresponds to one of the segment groups, and electrically connects one of the segments included in the corresponding segment group to one of the jumper wires. When the core and the commutator are attached to the rotary shaft, each connecting member is arranged at a position corresponding to one of the jumper wires as viewed in an axial direction of the rotary shaft. A short-circuit member assembly is provided on the end surface of the commutator facing the core to short-circuit the three segments included in each of the segment groups to each other. A magnetic pole body is provided around the core, and has six magnetic poles.

The present invention further provides a manufacturing method for the armature. The armature includes a rotary shaft, a core fixed on the rotary shaft, a plurality of coils provided on the core, and a commutator fixed on the rotary shaft. The core has a body section and a plurality of tooth sections extending from the body section to the outside in the radial direction and arranged along the circumferential direction of the body section. Each of the coils is provided around one of the tooth sections. The commutator has a plurality of segments arranged along the circumferential direction of the commutator. The manufacturing method includes: fixing the core and the commutator on the rotary shaft, the commutator having a plurality of connecting members each projecting to the outside in the radial direction of the commutator, and each connecting member being connected to one of the segments; successively winding a conductor on the tooth sections with at least one tooth section between each successive windings to form the coils, such that each portion of the conductor extending between two tooth sections located with at least one tooth section therebetween forms a jumper wire extending in the circumferential direction of the core so as to pass through a position corresponding to one of the connecting members; and electrically connecting each jumper wire to the corresponding connecting member.

The manufacturing method of another aspect of the present invention includes: successively winding a conductor on tooth sections with at least one tooth section between each successive windings to form coils, such that each portion of the conductor extending between two tooth sections located with at least one tooth section therebetween forms a jumper wire extending in the circumferential direction of a core; fixing the core on the rotary shaft before or after the coils are formed; fixing a commutator on the rotary shaft on which the core has been fixed, the commutator having a plurality of connecting members projecting to the outside in the radial direction of the commutator, each of the connecting members being connected to one of segments, and the connecting member coming into contact with one of the jumper wires when the commutator is fixed on the rotary shaft; and electrically connecting each jumper wire to the corresponding connecting member.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment embodying the present invention will now be described with reference to the accompanying drawings.

Figure 1:
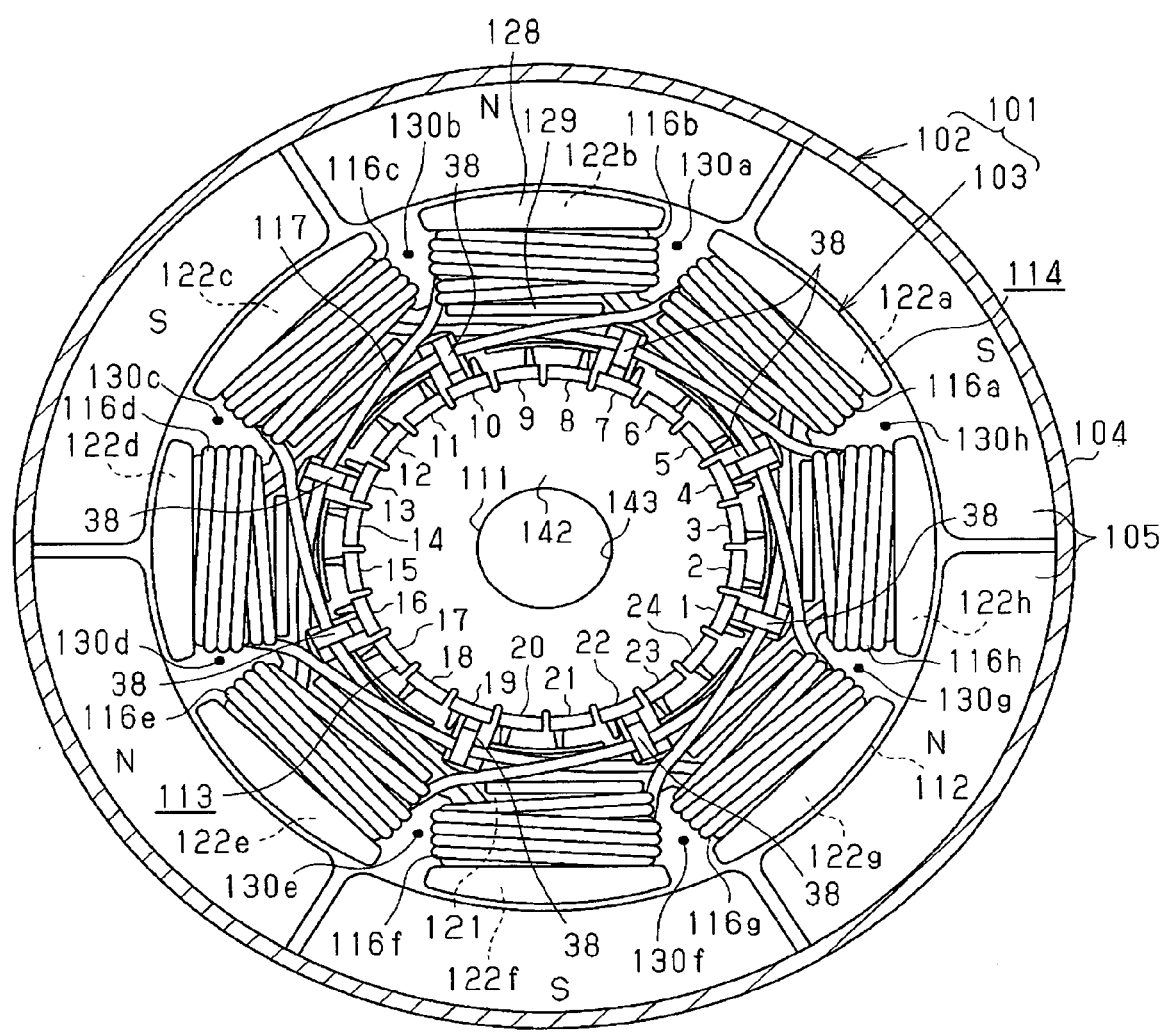
FIG. 1 is a plan cross-sectional view of a motor in accordance with a first embodiment of the present invention.

As shown in FIG. 1, a motor 101 in accordance with this embodiment is a DC motor of a 6-pole, 8-slot, and 24-segment type, and includes a stator 102 and an armature (rotor) 103. The stator 102 includes a substantially cylindrical yoke housing 104 having a bottom wall at one end thereof, and a plurality of (six in this embodiment) permanent magnets 105 which are fixed on the inner circumference surface of the yoke housing 104 and are arranged at equal angular intervals. These permanent magnets 105 function as a magnetic pole body having six magnetic poles. Also, on an end frame (not shown) fixed to the yoke housing 104 so as to close the opening of the yoke housing 104, a brush 106 for power supply on the positive pole side and a brush 107 for power supply on the negative pole side, which are connected to an external power source etc., are held (refer to FIG. 2).

In this specification, the terms "axial direction", "radial direction", and "circumferential direction" mean the directions defined with regard to the armature 103 unless otherwise noted especially.

Figure 2:
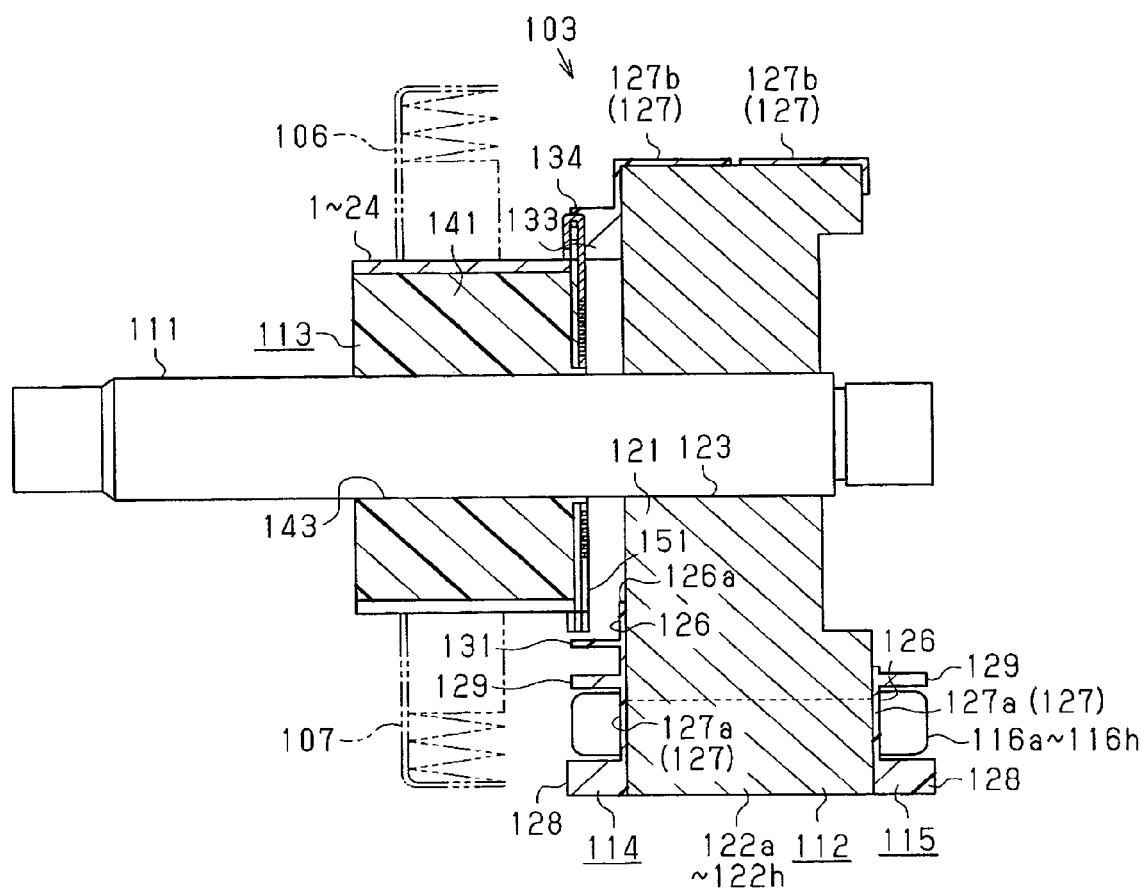
FIG. 2 is a cross-sectional view of an armature provided in the motor shown in FIG. 1.
Figure 3:
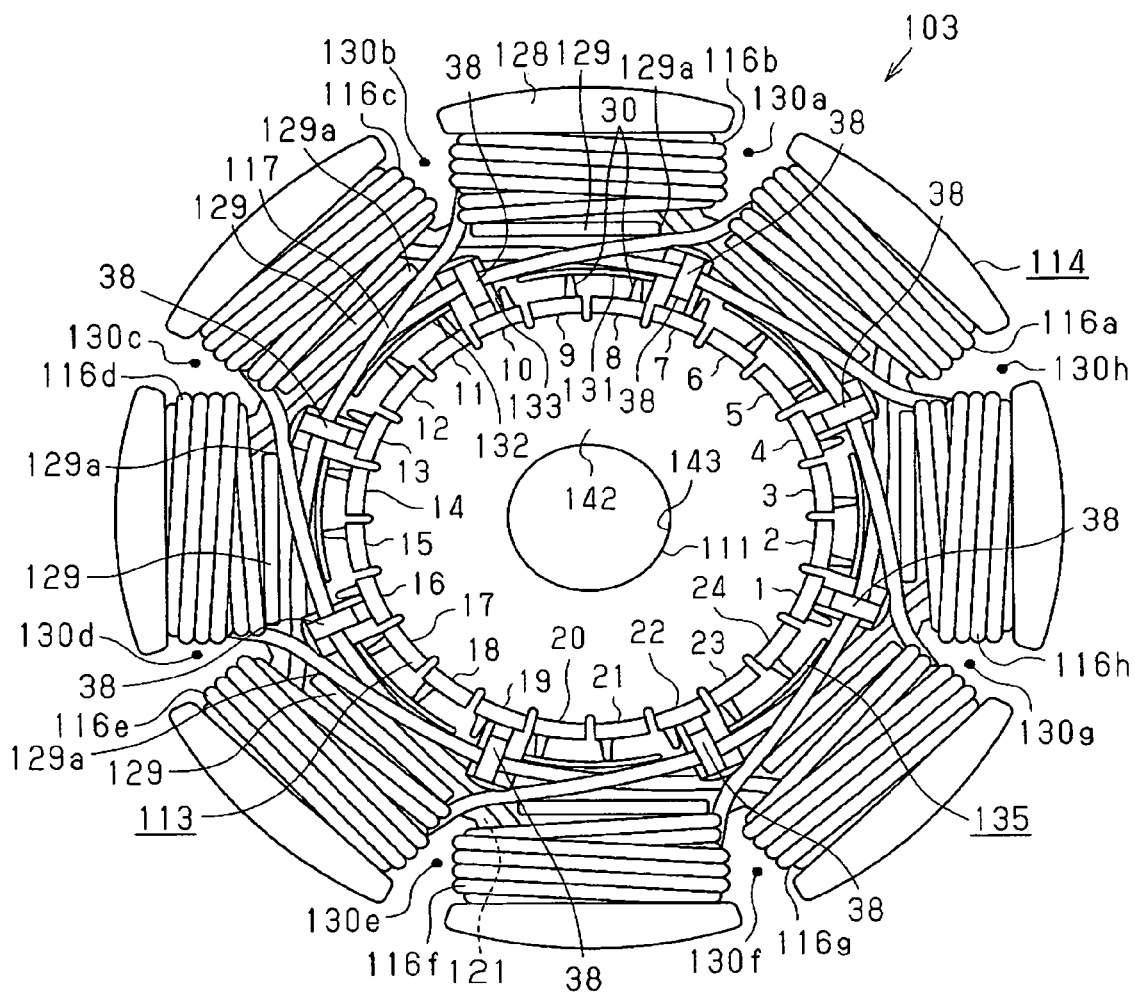
FIG. 3 is a plan view of the armature shown in FIG. 2.

As shown in FIGS. 2 and 3, the armature 103 includes a metal rotary shaft 111, a core 112 fixed on the rotary shaft 111, a commutator 113 also fixed on the rotary shaft 111, a pair of insulators 114 and 115 mounted on the core 112, and a plurality of coils 116a to 116h wound on the core 112 via the insulators 114 and 115. The rotary shaft 111 is supported by bearings (not shown) held in the center of the bottom wall of the yoke housing 104 and in the center of the end frame, and thereby the armature 103 is supported so as to be rotatable with respect to the yoke housing 104. The core 112 faces the permanent magnets 105, and the periphery thereof is surrounded by the permanent magnets 105 (refer to FIG. 1).

Figure 4:
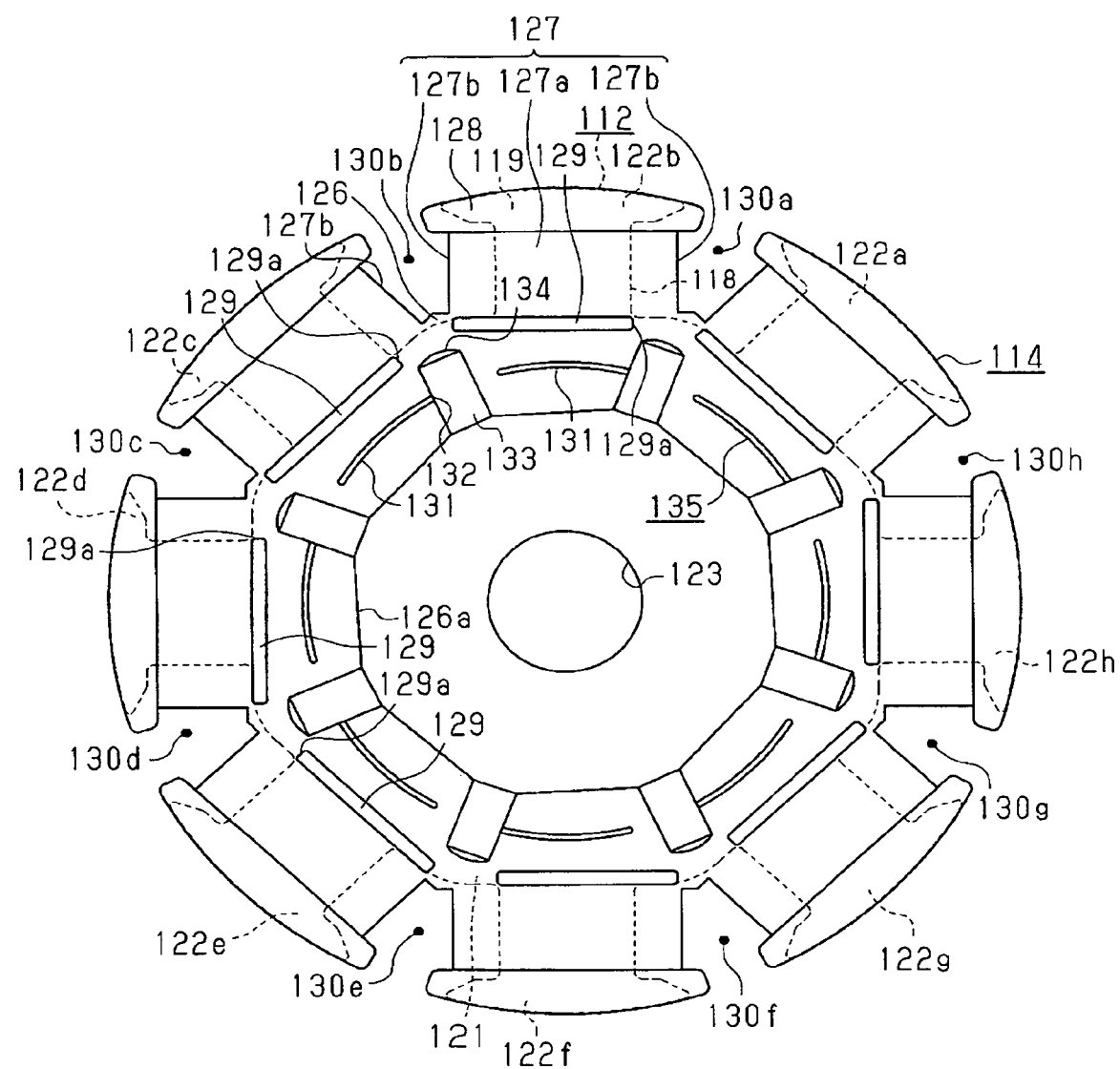
FIG. 4 is a plan view of a core mounted with an insulator.

The core 112 is formed by sintering, for example, magnetic powder, and, as shown in FIG. 4, includes a body section 121 having a substantially octagonal prism shape and eight tooth sections 122a to 122h extending to the outside in the radial direction. These tooth sections 122a to 122h are connected to the body section 121, and are arranged at equal angular intervals in the circumferential direction. Each of the tooth sections 122a to 122h has an extension portion 118 which has a fixed width in the circumferential direction and extends radially from the central portion of the side surface corresponding to the body section 121, and a projection 119 projecting from the end portion on the outside in the radial direction of the extension portion 118 to both sides in the circumferential direction, being formed substantially into a T shape.

Also, the core 112 (body section 121) has a shaft insertion hole 123 penetrating the central portion thereof. As shown in FIG. 2, the core 112 is fixed on the rotary shaft 111 by press fitting the rotary shaft 111 through the shaft insertion hole 123.

One insulator (first insulator) 114 facing the commutator 113 is formed of a synthetic resin, and, as shown in FIG. 4, has a plate-shaped body cover section 126 having a substantially octagonal shape, and eight tooth cover sections 127 extending from eight side surfaces of the body cover section 126 toward the outside in the radial direction. The body cover section 126 has a through hole 126a having a substantially octagonal shape in the central portion thereof. This body cover section 126 covers the outer peripheral edge portion of the end surface on one side in the axial direction of the body section 121.

Each tooth cover section 127 has an outer cylinder portion engaging with the outer wall surface of the corresponding one of the tooth sections 122a to 122h, and includes a first cover portion 127a covering the end surface on one side in the axial direction of the corresponding tooth section 122a to 122h, and a pair of second cover portions 127b covering the end surfaces on both sides in the circumferential direction of the corresponding tooth section 122a to 122h. That is to say, the tooth cover section 127 has a channel-shaped cross-section, and the end portion on the outside in the radial direction corresponding to the projection 119 is wider than other portions. One of the second cover portions 127b covering the end surface on one side in the circumferential direction of the corresponding tooth section 122a to 122h is continuous with the second cover portions 127b covering the end surfaces on the other side in the circumferential direction of the adjacent tooth sections 122a to 122h.

The first insulator 114 having the above-described shape is mounted to the core 112 from one side in the axial direction so that each tooth cover section 127 engages with the corresponding tooth section 122a to 122h, thereby covering the core 112 to the intermediate portion in the axial direction thereof.

Each tooth cover section 127 has a relatively thick first restriction wall portion 128 projecting in the axial direction at a position corresponding to the projection 119. As shown in FIG. 3, the first restriction wall portions 128 prevent the coils 116a to 116h wound on the tooth sections 122a to 122h via the first insulator 114 (tooth cover sections 127) from jutting out to the outside in the radial direction of the first insulator 114.

On the other hand, the body cover section 126 is formed with a plurality of (eight) second restriction wall portions 129 each of which extends along the edge of the body cover section 126 and projects in the axial direction. As shown in FIG. 3, the second restriction wall portions 129 prevent the coils 116a to 116h wound on the tooth sections 122a to 122h via the first insulator 114 (tooth cover sections 127) from jutting out to the inside in the radial direction of the first insulator 114.

The other insulator (second insulator) 115 basically has the same shape as that of the first insulator 114. This second insulator 115 is mounted to the core 112 from the side opposite to the first insulator 114, thereby covering the core 112 to the intermediate portion in the axial direction thereof. The core 112 mounted with the insulators 114 and 115 is formed with slots 130a to 130h between the adjacent tooth sections 122a to 122h (tooth cover sections 127). Each of the slots 130a to 130h allows the corresponding coil 116a to 116h wound on the tooth section 122a to 122h via the insulators 114 and 115 to pass through.

Next, a construction inherent to the first insulator 114 (a construction different from that of the second insulator 115) will be explained.

As shown in FIG. 4, each second restriction wall portion 129 of the first insulator 114 is arranged close to one side in the circumferential direction with respect to the corresponding tooth cover section 127 (the side corresponding to the counterclockwise rotation direction in FIG. 4), and a passage 129a is formed between the adjacent second restriction wall portions 129. As shown in FIG. 3, each passage 129a allows a conductor forming each coil 116a to 116h wound on the corresponding tooth section 122a to 122h to pass through.

That is to say, the conductor forming the coils 116a to 116h wound on the tooth sections 122a to 122h passes through the passages 129a located on both sides in the circumferential direction of the tooth sections 122a to 122h, and extends to the inside in the radial direction beyond the second restriction wall portions 129. Specifically, in each tooth section 122a to 122h, the passage 129a located on one side in the circumferential direction (the clockwise rotation direction side in FIG. 3) allows the conductor passing through the inside in the radial direction of the second restriction wall portions 129 and extending from another tooth section to the tooth section 122a to 122h to pass through. On the other hand, in each tooth section 122a to 122h, the passage 129a located on the other side in the circumferential direction (the counterclockwise rotation direction side in FIG. 3) allows the conductor passing through the inside in the radial direction of the second restriction wall portions 129 and extending from the tooth section 122a to 122h to another tooth section to pass through.

In this embodiment, the conductor forming the each coil 116a to 116h wound on the corresponding tooth section 122a to 122h extends to a tooth section located further than at least an adjacent tooth section (in this embodiment, the third tooth section from the tooth section 122a to 122h). Each coil 116a to 116h is wound by way of concentrated winding on the corresponding tooth section 122a to 122h. A step in which the conductor is wound on one of the tooth sections 122a to 122h and then is wound on the third tooth section from that tooth section is repeated, by which the coils 116a to 116h are wound on all of the tooth sections 122a to 122h. That is to say, the winding operation of the coils 116a to 116h on the tooth sections 122a to 122h is performed successively and continuously with at least one tooth section between each successive windings. The conductor extending between two tooth sections on which the conductor is wound continuously forms a jumper wire 117 extending in the circumferential direction on the inside in the radial direction of the second restriction wall portion 129. The "circumferential direction" in which each jumper wire 117 extends means the direction intersecting the radial direction, and does not mean the direction strictly follows the circumference.

Furthermore, the body cover section 126 is provided with an annular guide wall 135. This guide wall 135 is divided into a plurality of (eight) guide wall portions 131 by a plurality of (eight) notches 132 provided so as to be consistent with the positions in the circumferential direction of the slots 130a to 130h. Each guide wall portion 131 extends in the circumferential direction of the body cover section 126 and projects in the axial direction, and corresponds to one of the second restriction wall portions 129. Each guide wall portion 131 is located in an intermediate portion between the peripheral edge of the through hole 126a and the corresponding second restriction wall portion 129 in the radial direction of the body cover section 126. Each jumper wire 117 passes between one of the guide wall portions 131 and the corresponding second restriction wall portion 129. Each guide wall portion 131 guides the corresponding jumper wire 117 on the inside in the radial direction of the corresponding second restriction wall portion 129. The guide wall portions 131 regulate the movement of the jumper wires 117 to the inside in the radial direction, and approximately define the positions and postures of the jumper wires 117 with respect to the body cover section 126.

Each of the notches 132 is located in an intermediate portion in the longitudinal direction of the corresponding jumper wire 117 guided by the two guide wall portions 131 that are adjacent to each other with the notch 132 therebetween (refer to FIG. 3). Also, the body cover section 126 has a plurality of (eight) pedestal portions 133 extending to the outside in the radial direction so as to extend from the inner peripheral edge portion of the body cover section 126 and pass through the notches 132. The height in the axial direction of the pedestal portions 133 is smaller than that of the guide wall portion 131 (refer to FIG. 2). In the end portion on the outside in the radial direction of each pedestal portion 133, a positioning wall portion 134 projecting in the axial direction is formed. The notches 132, the pedestal portions 133, and the positioning wall portions 134 function to position the commutator 113 with respect to the core 112 when the coils 116a to 116h are connected electrically to the commutator 113.

Figure 5:
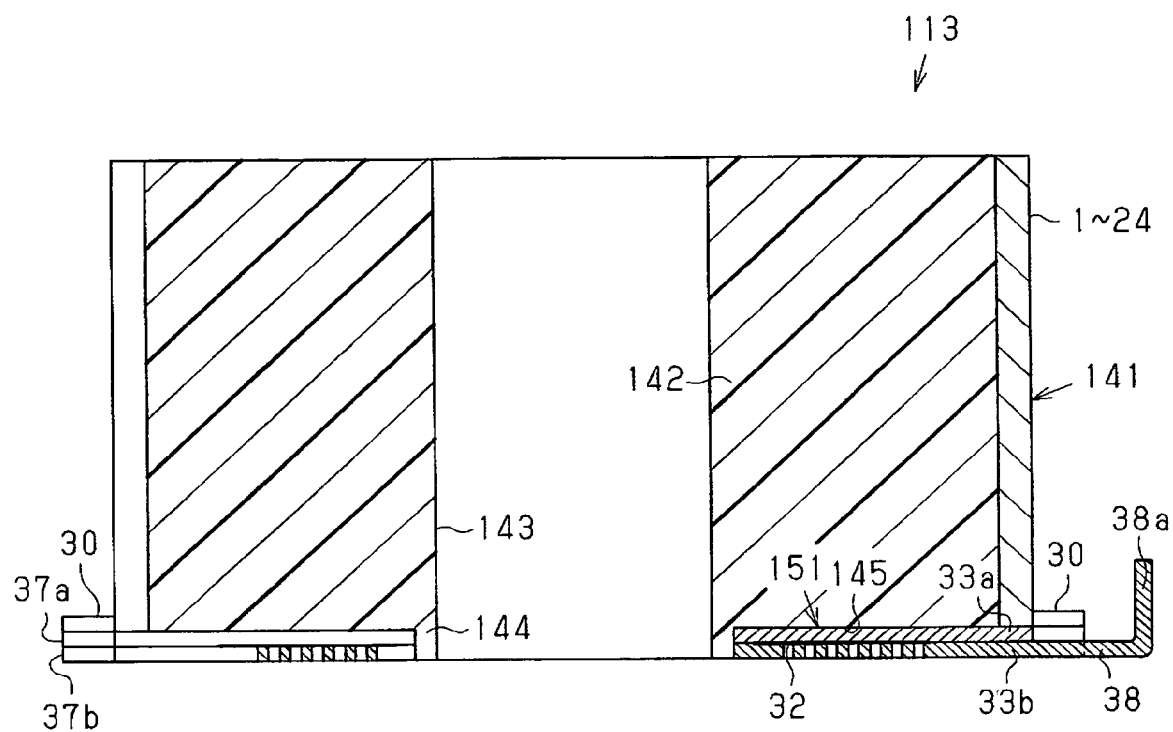
FIG. 5 is a cross-sectional view of a commutator taken along line 5-5 of FIG. 6.

As shown in FIG. 5, the commutator 113 has a commutator body 141 and a short-circuit member assembly 151. The commutator body 141 includes a substantially cylindrically-shaped insulating element 142 and a plurality of (24 in this embodiment) substantially rectangular plate shaped segments 1 to 24 disposed at equal angular intervals on the outer circumference surface of the insulating element 142 (refer to FIG. 3). The insulating element 142 has a shaft penetrating hole 143 in which the rotary shaft 111 is inserted.

On the end surface on one side in the axial direction of the insulating element 142 (the end surface facing the core 112, being the lower surface in FIG. 5), a circumference wall portion 144 projecting in the axial direction is formed. The circumference wall portion 144 is provided around the opening of the shaft penetrating hole 143. The end surface of the insulating element 142 having the circumference wall portion 144 defines an annular accommodation portion 145 ranging from the circumference wall portion 144 to the outer circumference surface of the insulating element 142.

Each of the segments 1 to 24 has a length equivalent to the axial length of the outer circumference surface of the insulating element 142, and is fixed to the outer circumference surface of the insulating element 142 so as to assume a substantially cylindrical shape as a whole. Each segment 1 to 24 is arranged so that the end face on one side in the axial direction thereof is flush with the bottom surface of the accommodation portion 145 (the end surface of the insulating element 142). The brush 106 for power supply on the positive pole side and the brush 107 for power supply on the negative pole side can come into contact with these segments 1 to 24 from the outside in the radial direction of the segments 1 to 24 (refer to FIG. 2). In the end portion on one side (the lower side in FIG. 5) in the axial direction of each segment 1 to 24, a protrusion 30 extending to the outside in the radial direction is formed. The protrusions 30 are provided so as to be connected to the short-circuit member assembly 151. Each protrusion 30 is arranged close to one side (the side corresponding to the clockwise rotation direction in FIG. 3) in the circumferential direction of the corresponding segment 1 to 24.

Figure 6:
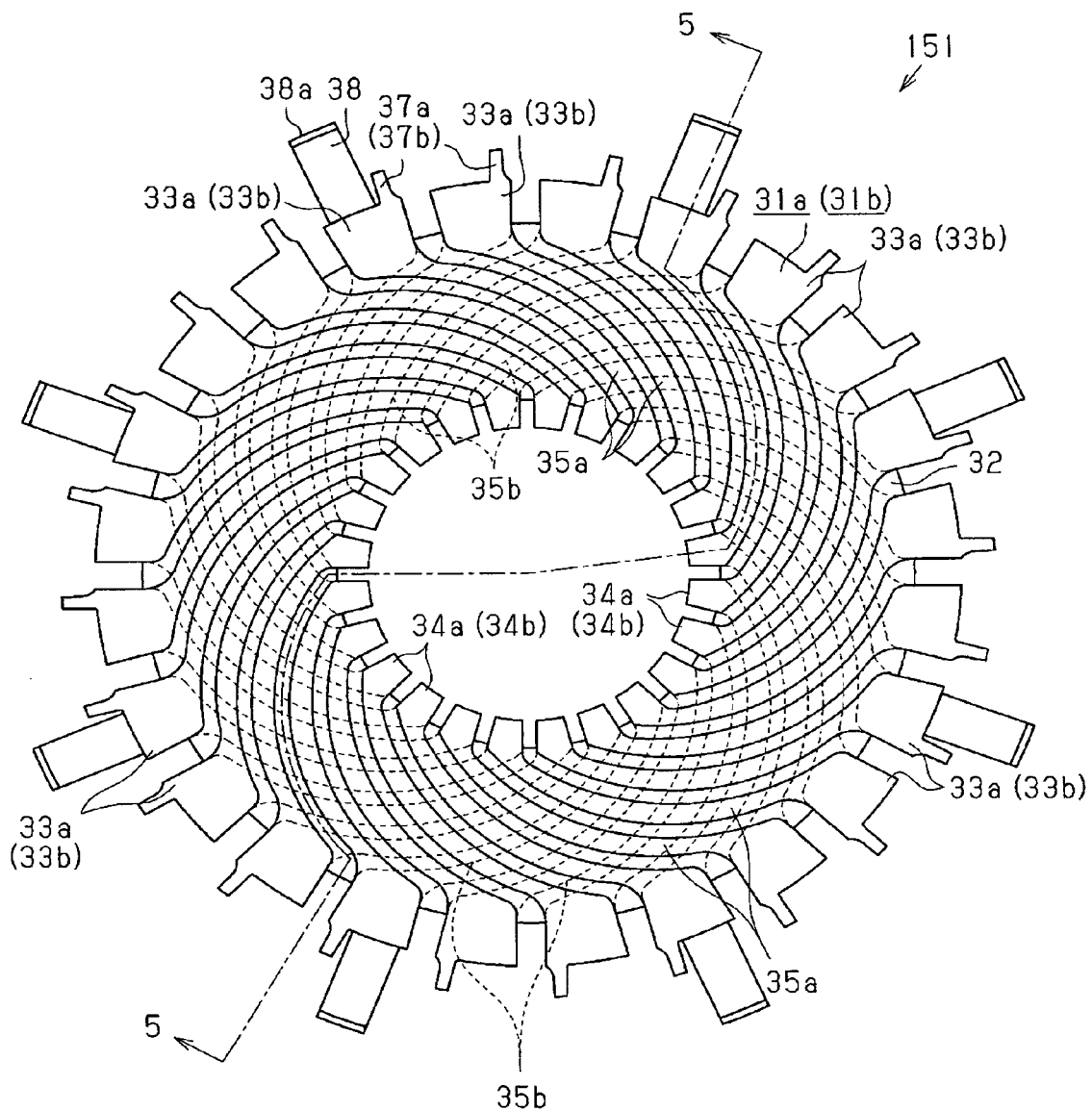
FIG. 6 is a plan view of a short-circuit member assembly.

As shown in FIG. 6, the short-circuit member assembly 151 has an annular shape, and includes a first conductive member group 31a, a second conductive member group 31b, and an insulating element 32 arranged between the conductive member groups 31a and 31b. The conductive member groups 31a and 31b basically have the same shape, and are symmetrical with respect to each other.

The first conductive member group 31a includes twenty-four first conductive members, and the second conductive member group 31b includes twenty-four second conductive members. The twenty-four first conductive members are arranged on one plane such that an annular shape is assumed as a whole and the adjacent members are not in contact with each other. Similarly, the twenty-four second conductive members are also arranged on one plane such that an annular shape is assumed as a whole and the adjacent members are not in contact with each other.

Each of the first conductive members has an outside terminal 33a located on the outside in the radial direction of the short-circuit member assembly 151, an inside terminal 34a located on the inside in the radial direction of the short-circuit member assembly 151, and a connecting portion 35a extending slantwise with respect to the radial direction of the short-circuit member assembly 151 between the outside terminal 33a and the inside terminal 34a which shift from each other through a predetermined angle in the circumferential direction. Similarly, each of the second conductive members has an outside terminal 33b located on the outside in the radial direction of the short-circuit member assembly 151, an inside terminal 34b located on the inside in the radial direction of the short-circuit member assembly 151, and a connecting portion 35b extending slantwise with respect to the radial direction of the short-circuit member assembly 151 between the outside terminal 33b and the inside terminal 34b which shift from each other through a predetermined angle in the circumferential direction. However, in the first conductive members and the second conductive members, the inclinations of the connecting portions 35a and 35b with respect to the radial direction of the short-circuit member assembly 151 are opposite to each other. Each connecting portion 35a, 35b connects the corresponding outside terminal 33a, 33b to the corresponding inside terminal 34a, 34b in a state in which the outside terminals 33a, 33b and the inside terminals 34a, 34b are shifted from each other by 60 degrees in the circumferential direction. Each connecting portion 35a, 35b extends along an involute curve.

The first conductive member group 31a is arranged so that the outside terminals 33a are located on an imaginary circle having an outside diameter that is the same as that of an imaginary circle on which the segments 1 to 24 are arranged. Similarly, the second conductive member group 31b is arranged so that the outside terminals 33b are located on an imaginary circle having an outside diameter that is the same as that of an imaginary circle on which the segments 1 to 24 are arranged. Each of the outside terminals 33a, 33b has a width in the circumferential direction narrower than that of the segments 1 to 24, and has a protrusions 37a, 37b extending to the outside in the radial direction in one side (the side corresponding to the clockwise rotation direction in FIG. 6) in the circumferential direction of the outside terminals 33a, 33b. The protrusions 37a, 37b have the same shape as that of the protrusions 30 of the segments 1 to 24 in the plan view taken in the axial direction. Each segment 1 to 24 is joined to the outside terminal 33a of one first conductive member and the outside terminal 33b of one second conductive member. Specifically, in a state in which the protrusion 30 of each segment 1 to 24 is lapped on the protrusion 37a of the outside terminal 33a and the protrusion 37b of the outside terminal 33b, the protrusions 30, 37a and 37b are joined, for example, by spot welding.

The twenty-four outside terminals 33b include eight outside terminals 33b each having a claw portion (connecting member) 38 extending to the outside in the radial direction. Specifically, every third outside terminals 33b has the claw portion 38. The outside terminals 33b having the claw portions 38 are arranged at equal angular intervals. The distance in the radial direction from the axial center of the short-circuit member assembly 151 to the distal end of each claw portion 38 is equal to the distance in the radial direction from the axial center of each first insulator 114 to the positioning wall portion 134 (refer to FIG. 4). Each claw portion 38 has a folded element 38a. This folded element 38a is bent so as to be at right angles to the remaining portion of the claw portion 38 in the state before the coils 116a to 116h are wound on the core 112.

The first conductive member group 31a is arranged such that the inner ends in the radial direction of the inside terminals 34a are positioned on an imaginary circle having the same diameter as the outside diameter of the circumference wall portion 144 (refer to FIG. 5) of the insulating element 142. Similarly, the second conductive member group 31b is arranged such that the inner ends in the radial direction of the inside terminals 34b are positioned on an imaginary circle having the same diameter as the outside diameter of the circumference wall portion 144 of the insulating element 142. In a state in which each inside terminal 34a is lapped on one inside terminal 34b, the inside terminals 34a and 34b are joined to each other, for example, by spot welding. Both of the conductive member groups 31a and 31b are connected electrically to each other by joining the inside terminals 34a and 34b to each other.

The insulating element 32 is formed of an insulating resin material, and has an annular shape so as to correspond to the arrangement and shapes of the connecting portions 35a, 35b. The insulating element 32 connects the conductive member group 31a to the conductive member group 31b in a state in which the connecting portions 35a are isolated from the connecting portions 35b. That is to say, the conductive member groups 31a and 31b are lapped on each other in the state in which the connecting portions 35a are isolated from the connecting portions 35b by the insulating element 32. The twenty-four conductive members forming the conductive member groups 31a, 31b are integrated via the insulating element 32 in a state of being separated spatially.

Although the conductive member groups 31a and 31b are somewhat axially displaced by the thickness of the insulating element 32 in the portion corresponding to the connecting portions 35a and 35b, the displacement in the axial direction thereof can be neglected substantially because the insulating element 32 is thin as shown in FIG. 5.

As shown in FIG. 5, the short-circuit member assembly 151 having the above-described construction is accommodated in the accommodation portion 145 in a state of being engaged with the circumference wall portion 144 of the commutator body 141. The thickness of the short-circuit member assembly 151 is set so that the short-circuit member assembly 151 does not project in the axial direction beyond the circumference wall portion 144 in the state of being accommodated in the accommodation portion 145. Also, in the state in which the short-circuit member assembly 151 is accommodated, the protrusion 30 of each of the segments 1 to 24 laps on one protrusion 37a and one protrusion 37b. By joining these protrusions 30, 37a and 37b lapped on each other, each segment 1 to 24 is connected electrically to the outside terminals 33a and 33b. The eight outside terminals 33b each having the claw portion 38 are connected to the segments 1, 4, 7, 10, 13, 16, 19 and 22. In the state in which the short-circuit member assembly 151 is fixed to the commutator body 141, each claw portion 38 extends to the outside in the radial direction beyond the outer circumference surface of the commutator body 141.

Figure 7A:
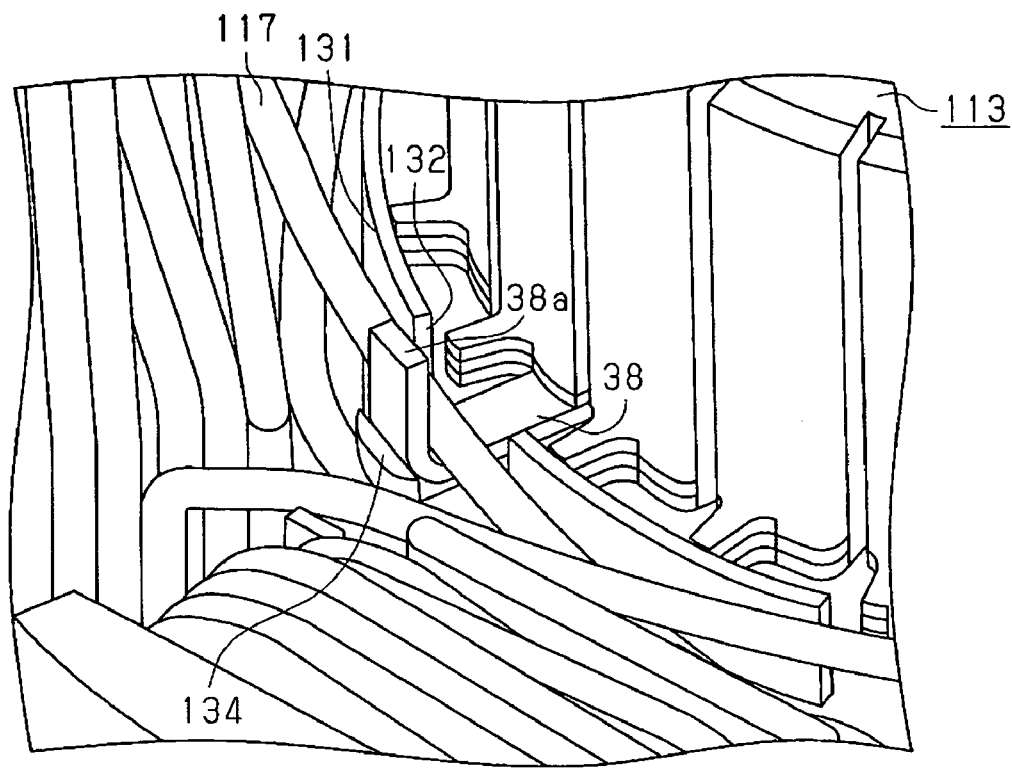
FIGS. 7A and 7B are partial perspective views for illustrating a manufacturing process for the armature shown in FIG. 2.

As shown in FIG. 2, the commutator 113 is fixed on the rotary shaft 111 by press fitting the rotary shaft 111 through the shaft penetrating hole 143. At this time, the claw portions 38 extend to the outside in the radial direction beyond the guide wall portions 131. The commutator 113 is positioned in the axial direction and in the circumferential direction with respect to the core 112 on the rotary shaft 111 so that each claw portion 38 passes through the corresponding notch 132 between the guide wall portions 131 and comes into contact with the pedestal portion 133 (refer to FIG. 7A). Also, as shown in FIG. 7A, the commutator 113 is positioned more stably by the distal end (folded element 38a) of each claw portion 38 engaging with the positioning wall portion 134 of the insulator 114. The notch 132, the pedestal portion 133, and the positioning wall portion 134 constitute a positioning section for holding or supporting the claw portion 38 to position the commutator 113.

Each claw portion 38 positioned by the corresponding positioning wall portion 134 is located in an intermediate position in the longitudinal direction of the corresponding jumper wire 117 guided by two of the guide wall portions 131 that are adjacent with the claw portion 38 being therebetween. That is to say, the jumper wire 117 is arranged on the claw portion 38 in an intermediate portion in the longitudinal direction thereof. As shown in FIG. 7A, at the stage until the winding operation of the coils 116a to 116h is finished, a shift to the outside in the radial direction of the jumper wire 117 arranged on the claw portion 38 is restricted by the folded element 38a bent at right angles to the claw portion 38.

Figure 7B:
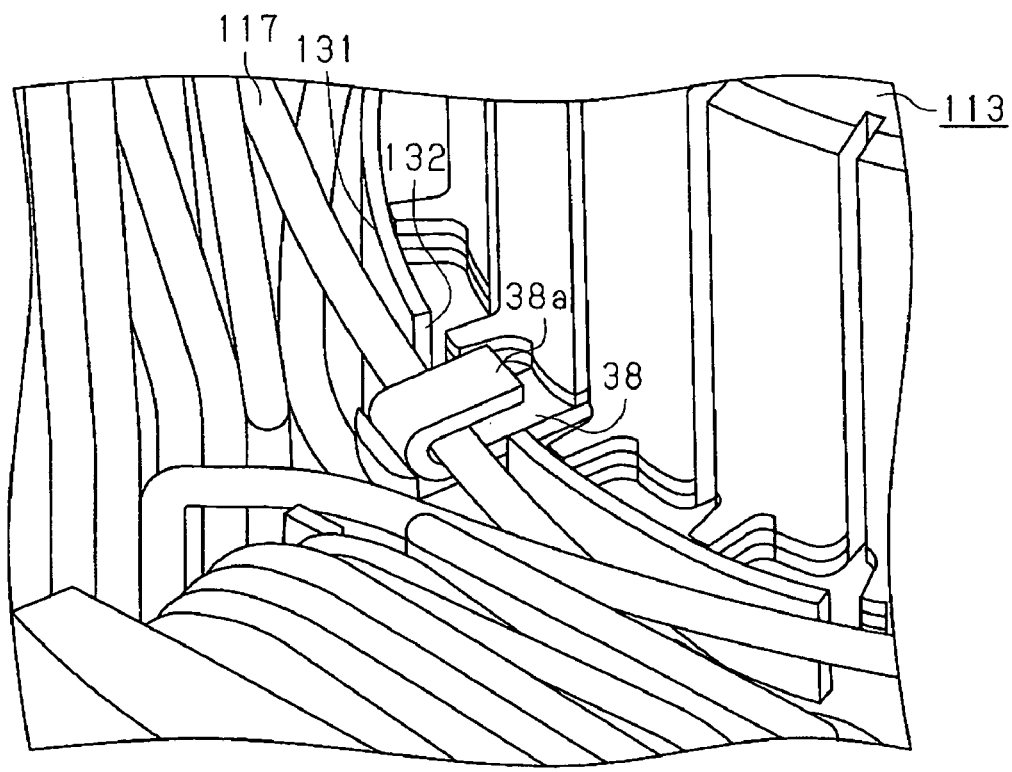

As shown in FIG. 7B, at the stage at which the winding operation of the coils 116a to 116h has been finished, the folded elements 38a are folded toward the inside in the radial direction so as to hold the jumper wires 117, and each jumper wire 117 and the corresponding claw portion 38 are joined by fusing etc. As a result, the jumper wire 117 and the claw portion 38 are connected electrically to each other. Each jumper wire 117 extending between the coils 116a to 116h wound on one of the tooth sections 122a to 122h and the coil wound on another tooth section following the winding operation of the coil 116a to 116h corresponds to the end portion of the coil 116a to 116h extending from the tooth section 122a to 122h.

The height in the axial direction of the pedestal portions 133 with which the claw portions 38 come into contact is smaller that the height of the guide wall portions 131 (refer to FIG. 2). Therefore, in the state in which the commutator 113 is assembled, a part of the commutator 113 is put in a space surrounded by the guide wall portions 131 by a difference in height in the axial direction between the guide wall portions 131 and the pedestal portions 133, thereby restraining an increase in the length in the axial direction of the armature 103.

Figure 8:
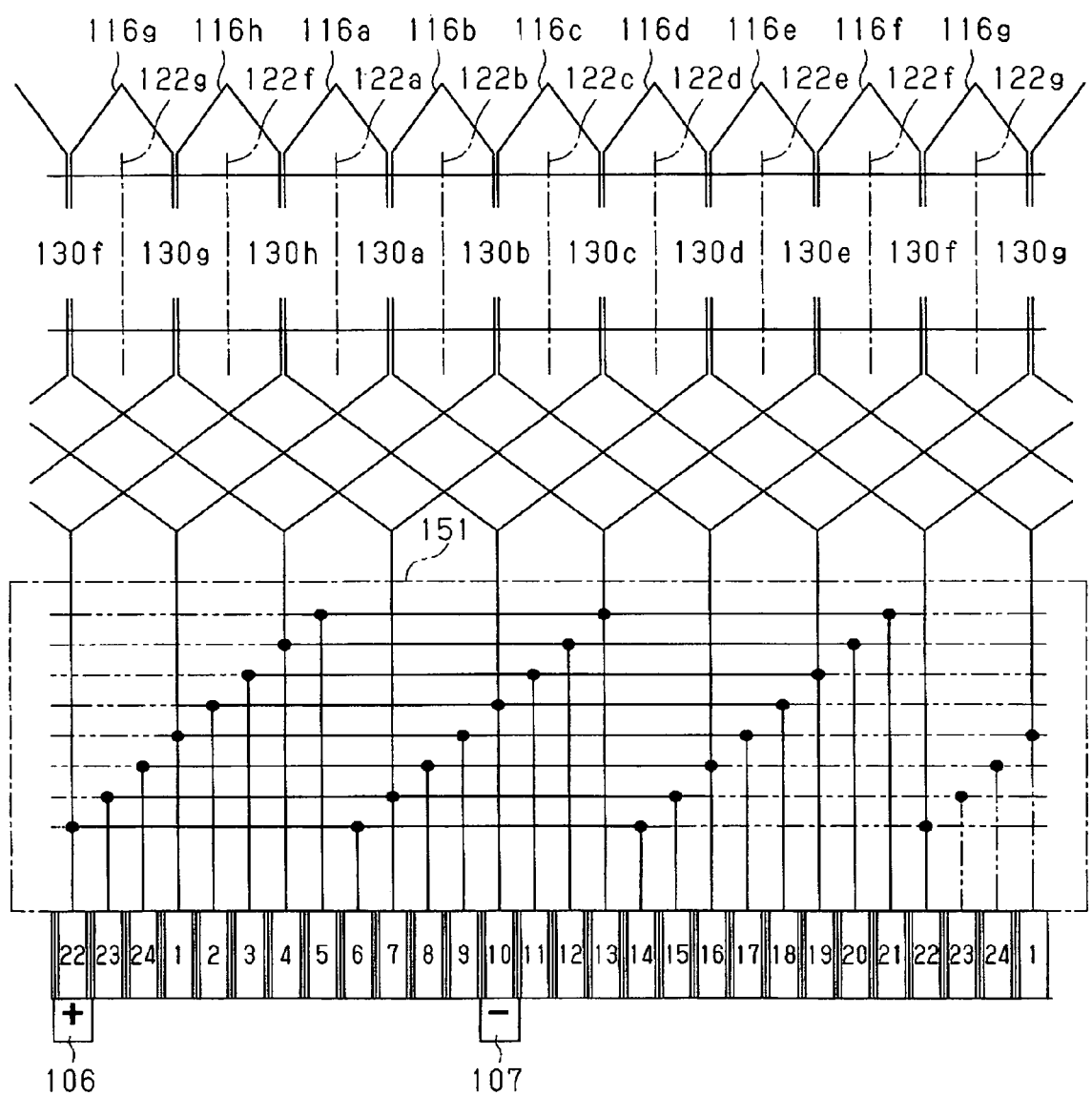
FIG. 8 is a schematic diagram showing a state in which an armature is developed.

FIG. 8 is a schematic diagram showing a state in which the armature 103 constructed as described above is developed. By the short-circuit member assembly 151, each of the segments 1 to 24 is connected so as to have the same potential as that of the eighth and sixteenth segments in the circumferential direction. That is to say, the short-circuit member assembly 151 electrically connects the three segments arranged at intervals of 120 degrees to each other so as to provide the same potential. A total of eight groups of three segments connected electrically in this manner exist. Each of the eight claw portions 38 arranged at equal angular intervals corresponds to one of the eight segment groups. Although not shown in FIG. 8, the eight claw portions 38 are arranged at the positions in the circumferential direction corresponding to the segments 1, 4, 7, 10, 13, 16, 19 and 22, and are connected to the corresponding segments.

Next, a manufacturing method for the armature 103 will be explained generally. First, the core 112 mounted with the insulators 114 and 115 and the commutator 113 are fixed on the rotary shaft 111. At this time, the commutator 113 is assembled so that each of the claw portions 38 passes through the corresponding notch 132 between two adjacent guide wall portions 131 and comes into contact with the corresponding pedestal portion 133. At this time, the positional relationship of the commutator 113 with respect to the core 112 is the positional relationship at the time when the motor 101 has been completed, namely, the positional relationship such that the commutator 113 need not be moved again with respect to the rotary shaft 111.

Next, a coil is formed by winding a conductor on a predetermined one (first tooth section) of the tooth sections 122a to 122h, and thereafter the conductor is lead to the inside in the radial direction of the second restriction wall portion 129 through the passage 129a located on one side in the circumferential direction of the first tooth section (the counterclockwise rotation direction side in FIG. 3). Then, the conductor is extended to the third tooth section from the first tooth section (second tooth section) while being guided by the guide wall portion 131, and is wound on the second tooth section. At this time, the conductor is led to the outside in the radial direction of the second restriction wall portion 129 through the passage 129a located on one side in the circumferential direction of the second tooth section (the clockwise rotation direction side in FIG. 3). The portion of the conductor extending between the first tooth section and the second tooth section located with two tooth sections being therebetween forms the jumper wire 117. The jumper wire 117 guided by the guide wall portion 131 is automatically arranged on the claw portion 38 in the intermediate portion in the longitudinal direction thereof.

By successively winding the conductor on the tooth sections as described above, the coils 116a to 116h are formed around all of the tooth sections 122a to 122h.

Subsequently, the folded elements 38a are folded by using, for example, a predetermined jig so as to hold the jumper wires 117, and the jumper wires 117 and the claw portions 38 are jointed by fusing etc. Thereby, the commutator 113 and the coils 116a to 116h are connected electrically to each other, and the manufacture of the armature 103 is completed.

This embodiment described in detail above has the following advantages.

(1) As shown in FIGS. 3 and 7A, each claw portion 38 extends to the outside in the radial direction of the corresponding guide wall portion 131, and is arranged at a position where the corresponding jumper wire 117 passes through. For this reason, when the coils 116a to 116h are formed, each jumper wire 117 guided by the corresponding guide wall portion 131 is naturally arranged on the claw portion 38 in the intermediate portion in the longitudinal direction thereof. Therefore, when the jumper wire 117 is joined to the claw portion 38, a dedicated step of moving the jumper wire 117 to the position of the claw portion 38 and engaging it with the claw portion 38 need not be performed separately from the step of forming the coils 116a to 116h, so that the work for joining the coils 116a to 116h to the claw portions 38 is easy.

(2) Each claw portion 38 is extended to the outside in the radial direction of the corresponding guide wall portion 131 without interference with the guide wall portion 131 by passing through the corresponding notch 132. The claw portion 38 passing through the notch 132 is positioned by the positioning wall portion 134. Therefore, the jumper wire 117 can be arranged on the claw portion 38 smoothly and reliably.

(3) The claw portions 38 are provided integrally with the short-circuit member assembly 151. Therefore, the construction is simplified, and the increase in the number of parts can be restrained.

(4) As shown in FIG. 2, the pedestal portions 133, on each of which the claw portion 38 is mounted, hold the claw portions 38 at a position separated in the axial direction from the body cover section 126. Therefore, the portion of the conductor other than the jumper wires 117 joined to the claw portions 38 can be prevented from coming into contact with the claw portions 38.

(5) As shown in FIG. 2, a part of the commutator 113 including the claw portions 38 is put in the space surrounded by the guide wall portions 131 by a difference in height in the axial direction between the guide wall portions 131 and the pedestal portions 133. Therefore, the size in the axial direction of the armature 103 can be decreased.

(6) When the commutator 113 is assembled to the rotary shaft 111 as shown in FIG. 2, the positional relationship of the commutator 113 with respect to the core 112 is the positional relationship at the time when the motor 101 has been completed. In this state, the joint portions between the jumper wires 117 and the claw portions 38 are exposed to the outside, so that there is no hindrance in a joining step in which the jumper wires 117 and the claw portions 38 are joined to each other. Therefore, the coils 116a to 116h can be wound and the jumper wires 117 and the claw portions 38 can be joined to each other in the state in which the positional relationship of the commutator 113 with respect to the core 112 is, from the first, the positional relationship at the time when the motor 101 has been completed. That is to say, a step of moving the commutator 113 in the axial direction with respect to the rotary shaft 111 has only to be performed only before the winding step and the joining step are performed. Therefore, the increase in the number of steps for manufacturing the motor can be avoided. Also, the commutator 113 need not be moved with respect to the rotary shaft 111 after the jumper wires 117 have been joined to the claw portions 38. Therefore, the deformation or damage of the joint portions between the jumper wires 117 and the claw portions 38 caused by the movement is avoided, and hence the reliability of the joint portions is improved.

(7) Since each claw portion 38 is arranged between two adjacent tooth sections, each jumper wire 117 can be joined easily without interference with the coil on the tooth section.

(8) Since the coils 116a to 116h is wound by way of concentrated winding on the tooth sections 122a to 122h, the space factor of the coils 116a to 116h increases, thereby improving the performance of the DC motor 101.

(9) The twenty-four segments 1 to 24 are divided into eight segment groups, and the three segments included in each group are short-circuited by the short-circuit member assembly 151. Thereby, a configuration which is provided with only one brush 106 for power supply on the positive pole side and only one brush 107 for power supply on the negative pole side can be adopted, which contributes to further miniaturization of the DC motor 101.

(10) The DC motor 101 of this embodiment has six magnetic poles. Also, the core 112 has the eight tooth portions 122a to 122h, namely, the eight slots 130a to 130h. The commutator 113 includes the twenty-four segments 1 to 24, and the segments 1 to 24 include a total of eight segment groups, one group consisting of three segments short-circuited by the short-circuit member assembly 151. In the case where such a configuration is adopted, a torque vector having the same magnitude and reverse direction is generated between each pair of the slots 130a to 130h located at a symmetrical position with respect to the axis of the armature 103. As a result, vibrations of the armature 103 are restrained, and hence a less-vibrating DC motor 101 can be provided.

Hereunder, a second embodiment embodying the present invention will be described with reference to the accompanying drawings, focusing on points of difference from the first embodiment.

Figure 9:
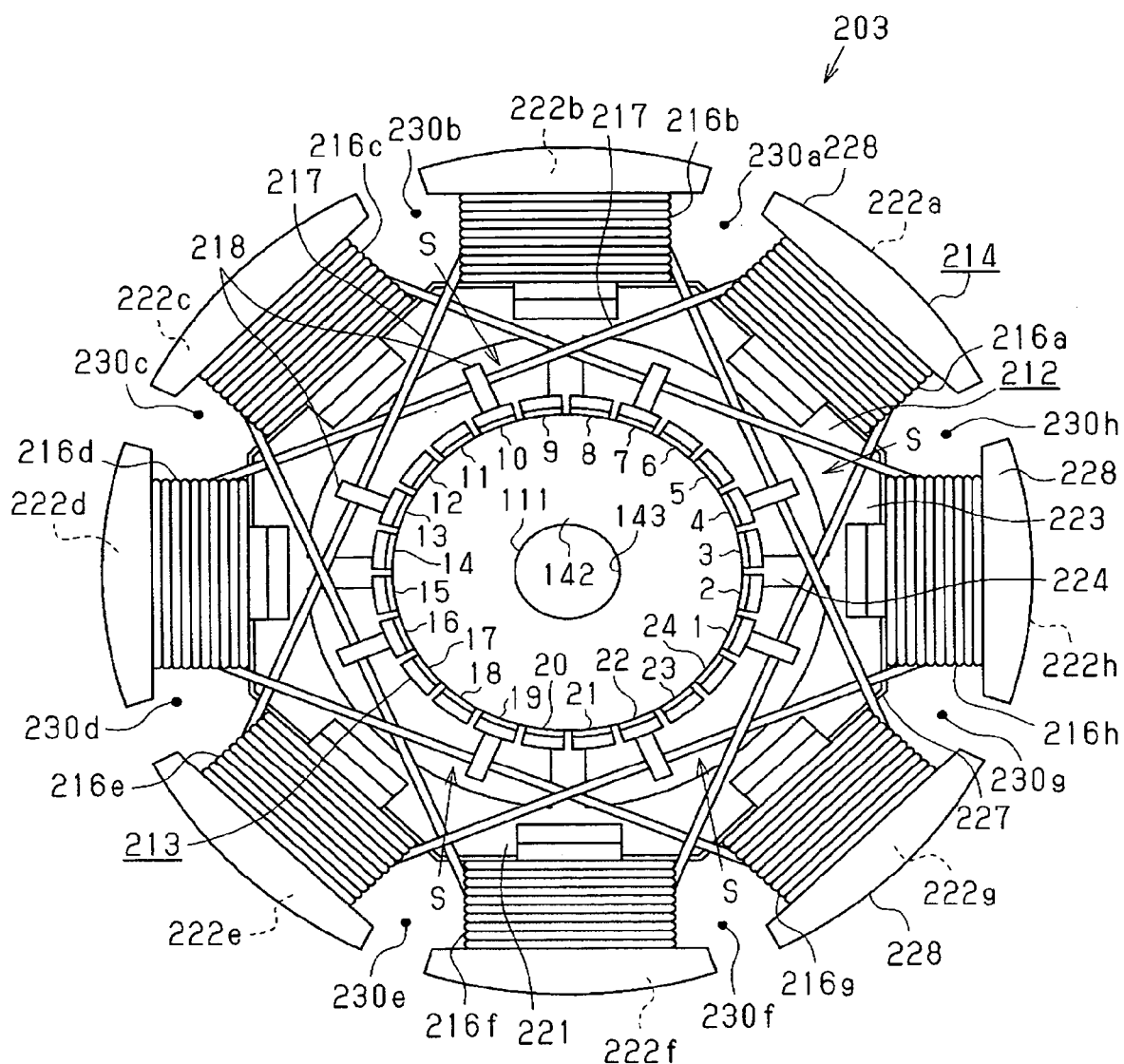
FIG. 9 is a plan view of an armature in accordance with a second embodiment of the present invention.
Figure 10:
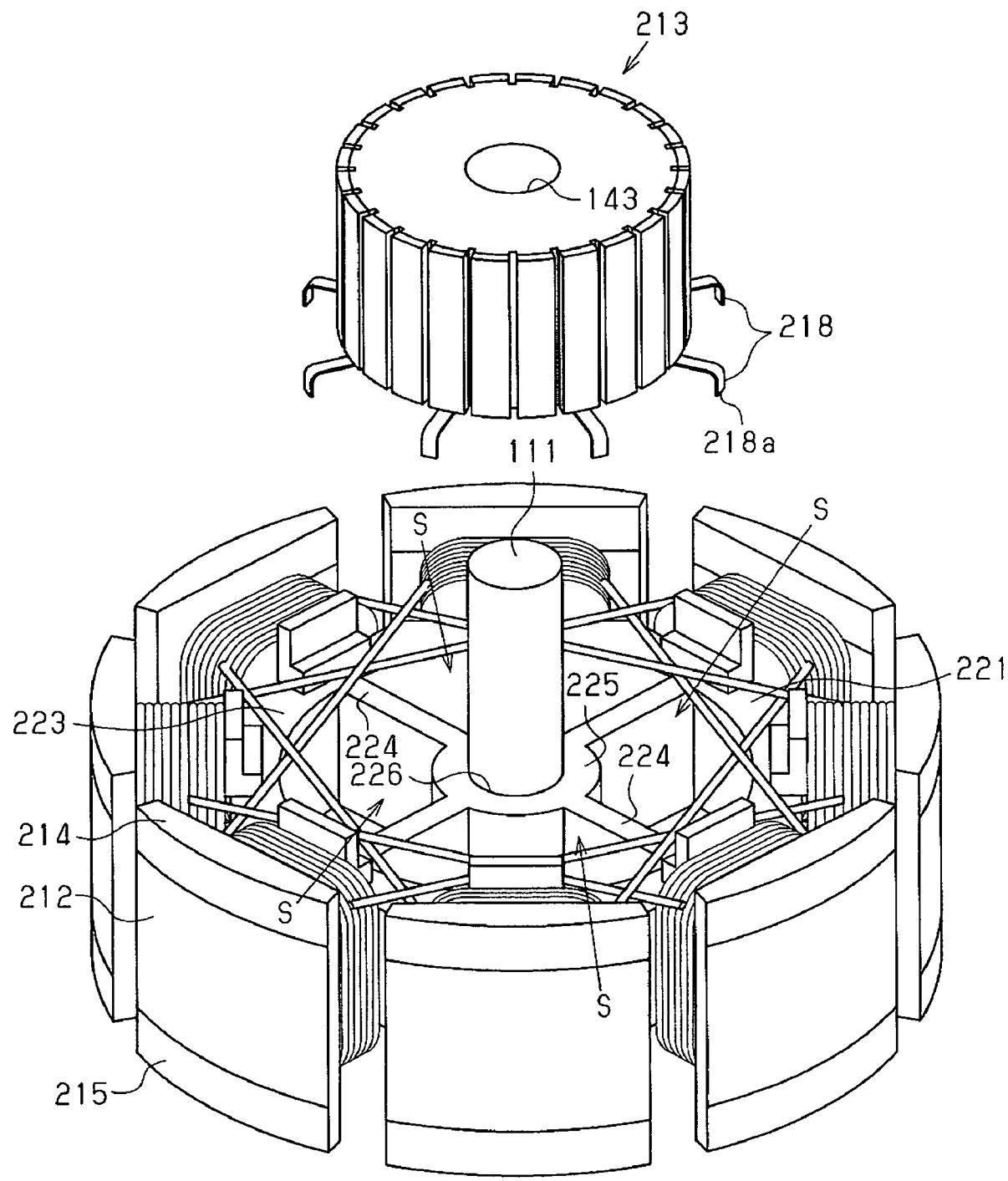
FIG. 10 is an exploded perspective view of the armature shown in FIG. 9.

As shown in FIGS. 9 and 10, an armature 203 of this embodiment includes the rotary shaft 111, a core 212 fixed on the rotary shaft 111, a commutator 213 also fixed on the rotary shaft 111, a pair of insulators 214 and 215 mounted on the core 212 (refer to FIG. 10), and a plurality of coils 216a to 216h wound on the core 212 via the insulators 214 and 215.

The core 212 is formed by sintering, for example, magnetic powder, and includes a cylindrical body section 221 having an outer wall surface of an octagonal cross-sectional shape and eight tooth sections 222a to 222h similar to the tooth sections 122a to 122h. The body section 221 has an outer cylinder portion 223, four arm portions 224, and an inner cylinder portion 225. The outer cylinder portion 223 has the outer wall surface of an octagonal cross-sectional shape and also has an inner circumference surface having a circular cross-sectional shape. The arm portions 224 are arranged at equal angular intervals, and extend radially between both the cylinder portions 223 and 225 so as to connect the outer cylinder portion 223 to the inner cylinder portion 225.

The arm portions 224 and the inner cylinder portion 225 form a connecting portion for connecting the core 212 to the rotary shaft 111, and the inner cylinder portion 225 is formed with a shaft insertion hole 226. The core 212 is fixed on the rotary shaft 111 by press fitting the rotary shaft 111 through the shaft insertion hole 226. Each of the arm portions 224 is arranged so as to correspond to one of four tooth sections 222b, 222d, 222f and 222h that are arranged with one tooth section between each pair. Specifically, each arm portion 224 is arranged so as to align with the central portion in the circumferential direction of the corresponding tooth section. Between the outer cylinder portion 223 and the inner cylinder portion 225, four void portions S defined by the arm portions 224 are formed. These void portions S penetrate the core 212 in the axial direction.

One insulator (first insulator) 214 facing the commutator 213 is formed of a synthetic resin, and has a cylindrical body cover section 227 having an octagonal outer cylinder portion corresponding to the outer wall surface of the body section 221, and eight tooth cover sections 228 extending from eight side surfaces of the body cover section 227 toward the outside in the radial direction. Each tooth cover section 228 has an outer cylinder portion engaging with one of the tooth sections 222a to 222h. The body cover section 227 is engaged with the body section 221, thereby covering the outer wall surface on one side in the axial direction of the body section 221. Also, each tooth cover section 228 is engaged with the corresponding tooth section 222a to 222h, thereby covering the end surface on one side in the axial direction and the side surfaces on both sides in the circumferential direction of the tooth section 222a to 222h. That is to say, the first insulator 214 covers the core 212 to an intermediate portion in the axial direction by being mounted to the core 212 from one side in the axial direction.

The other insulator (second insulator) 215 basically has the same shape as that of the first insulator 214. This second insulator 215 is mounted to the core 212 from the side opposite to the first insulator 214, thereby covering the core 212 to the intermediate portion in the axial direction thereof. The core 212 mounted with the insulators 214 and 215 is formed with slots 230a to 230h between the adjacent tooth sections 222a to 222h (tooth cover sections 228). Each of the slots 230a to 230h allows one of the coils 216a to 216h wound on the corresponding tooth section 222a to 222h via the insulators 214 and 215 to pass through.

In this embodiment, as in the above-described first embodiment, a step in which after a conductor has been wound on one of the tooth sections 222a to 222h, the conductor is wound on a tooth section separated by a plural number from that tooth section (herein, the third tooth section) is repeated, by which the coils 216a to 216h are wound (by way of concentrated winding) on the tooth sections 222a to 222h. The conductor extending between two tooth sections on which the coil has been wound continuously forms a jumper wire 217 extending in a straight line form in a tensioned state along the circumferential direction (along the direction crossing the radial direction) on the inside in the radial direction of the first insulator 214. Each jumper wire 217 leads from one side in the circumferential direction of an arbitrary tooth section 222a to 222h (the counterclockwise rotation direction in FIG. 9) to another tooth section located at a position at which two adjacent tooth sections are passed. As shown in FIG. 9, in the plan view taken in the axial direction, each jumper wire 217 is arranged so that the intermediate portion in the longitudinal direction thereof crosses a location (space) corresponding to the void portion S. The jumper wire 217 extends in a straight line form in a tensioned state, by which the position and posture thereof is maintained.

The commutator 213 includes, like the commutator 113 in the first embodiment, the commutator body 141 (refer to FIG. 5) and the short-circuit member assembly 151 (refer to FIG. 6). In this embodiment, however, the eight outside terminals 33b connected to the segments 1, 4, 7, 10, 13, 16, 19 and 22 each has a claw portion (connecting member) 218 having a shape different from that of the claw portions 38 in the first embodiment as shown in FIG. 10. These claw portions 218 extend toward the outside in the radial direction, and also are bent downward so that the distal ends thereof extend toward the core 212.

As shown in FIG. 10, each claw portion 218 corresponds to one of the jumper wires 217. The distance in the radial direction from the axial center of the commutator 213 to the distal end portion of each claw portion 218 is shorter than the radius of the inner circumference surface of the outer cylinder portion 223 of the core 212, and is longer than the distance in the radial direction from the axial center of the core 212 to the intermediate portion in the longitudinal direction of the corresponding jumper wire 217. Each claw portion 218 has a folded element 218a, and this folded element 218a is bent so as to be at right angles to the remaining portion of the claw portion 218 in the state before being joined to the jumper wire 217. The outside diameter of the commutator 213 is smaller than the inside diameter of the outer cylinder portion 223 of the core 212.

The commutator 213 is fixed on the rotary shaft 111 by press fitting the rotary shaft 111 into the shaft penetrating hole 143. The coils 216a to 216h are wound in advance on the core 212 fixed on the rotary shaft 111, and each jumper wire 217 extending between two tooth sections on which the coil is wound continuously is held at a predetermined position by the tension acting on the jumper wire itself. Each claw portion 218 is arranged at the angle position between the adjacent arm portions 224, namely, in the location corresponding to the void portion S, and is arranged on the corresponding jumper wire 217 and comes into contact with an intermediate portion in the longitudinal direction of the jumper wire 217.

Figure 11A:
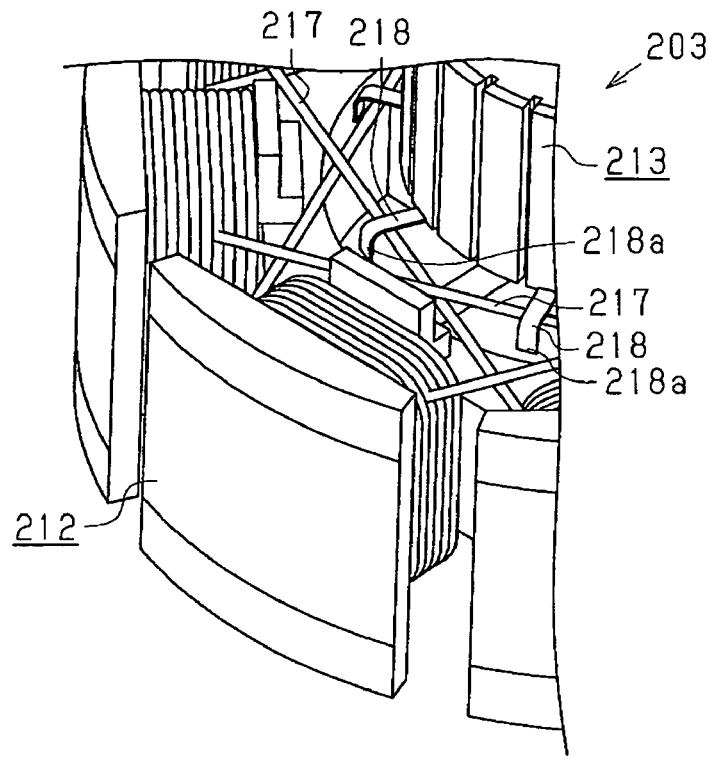
FIGS. 11A and 11B are partial perspective views for illustrating a manufacturing process for the armature shown in FIG. 9.

As shown in FIG. 11A, each claw portion 218 arranged on the corresponding jumper wire 217 comes into contact with the intermediate portion in the longitudinal direction of the jumper wire 217 without interference with the core 212, other jumper wires 217, and the like. In particular, the contact portion between the jumper wire 217 and the claw portion 218 is opened to both sides in the axial direction of the armature 203 by the presence of the void portion S, so that the contact portion is accessible from both sides in the axial direction.

Figure 11B:
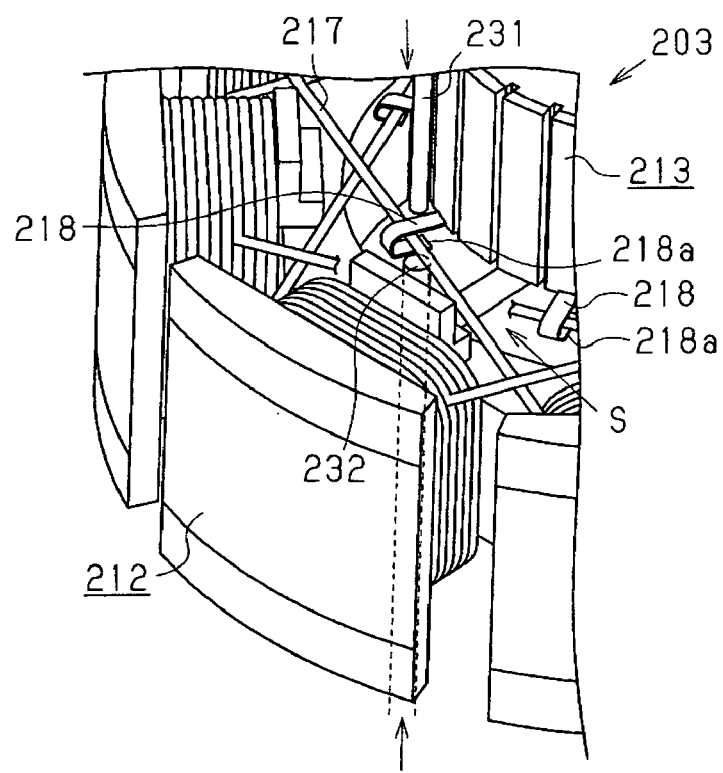

In the state in which each claw portion 218 is in contact with the corresponding jumper wire 217, as shown in FIG. 11B, the folded element 218a is folded toward the inside in the radial direction so that the folded element 218a holds the jumper wire 217, and the jumper wire 217 and the claw portion 218 are joined (welded) by fusing with a pair of jigs 231 and 232 inserted from both sides in the axial direction. As a result, the jumper wire 217 and the claw portion 218 are connected electrically to each other. The jumper wire 217 corresponds to the end portion of the conductor forming the coil 216a to 216h.

Next, a manufacturing method for the armature 203 will be explained generally. First, the coils 216a to 216h are wound on the core 212 mounted with the insulators 214 and 215. That is to say, after the conductor has been wound on a predetermined one (first tooth section) of the tooth sections 222a to 222h to form the coil, the conductor is extended to the third tooth section from the first tooth section (second tooth section) and is wound on the second tooth section. At this time, the portion of the conductor extending between two continuously formed coils, namely, the jumper wire 217 extends in a straight line form along the circumferential direction in a tensioned state. By successively winding the conductor on each of the tooth sections in this manner, the coils 216a to 216h are formed around all of the tooth sections 222a to 222h. The fixing (press fitting step) of the core 212 to the rotary shaft 111 may be performed before or after the winding step of the coils 216a to 216h.

Next, the commutator 213 is fixed on the rotary shaft 111 to which the core 212 has been fixed. At this time, the commutator 213 is assembled so that each claw portion 218 comes into contact with the intermediate portion in the longitudinal direction of one of the corresponding jumper wires 217. The positional relationship of the commutator 213 with respect to the core 212 at this time is the positional relationship at the time when the motor has been completed, namely, the positional relationship such that the commutator 213 need not be moved again with respect to the rotary shaft 111.

Subsequently, the folded element 218a is folded so as to hold the jumper wire 217, and the jumper wire 217 and the claw portion 218 are joined to each other by fusing by using the jigs 231 and 232 inserted from both sides in the axial direction. One jig 232 can easily access the joint portion between the jumper wire 217 and the claw portion 218 by passing through the void portion S. Resultantly, the commutator 213 and the coils 216a to 216h are connected electrically to each other, by which the manufacture of the armature 203 is completed.

This embodiment described in detail above has the following advantages.

(1) Since a tension acts on each jumper wire 217 extending between two tooth sections, after the coils 216a to 216h have been wound, each jumper wire 217 is held at a predetermined position by the tension. On the other hand, the claw portions 218 of the commutator 213 extend to the outside in the radial direction from the end portions of the eight segments 1, 4, 7, 10, 13, 16, 19 and 22, and each claw portion 218 is arranged at the position corresponding to one of the jumper wires 217. Therefore, the coils 216a to 216h (the jumper wires 217) and the commutator 213 (the claw portions 218) can easily be connected to each other without the use of a holding member for holding the jumper wires 217. Also, since the coils 216a to 216h are wound on the core 212 before the commutator 213 is installed on the rotary shaft 111, the claw portions 218 are brought into contact with the jumper wires 217 merely by installing the commutator 213 on the rotary shaft 111. Therefore, a step of hooking the jumper wires 217 to the claw portions 218 is not needed, so that the number of steps can be decreased.

(2) The contact portion between each jumper wire 217 and the corresponding claw portion 218 is opened to both sides in the axial direction of the armature 203 by the presence of the void portion S. Therefore, the jigs 231 and 232 can be brought close to the contact portion between the jumper wire 217 and the claw portion 218 from both sides in the axial direction without interference with other members to join the claw portion 218 and the jumper wire 217 by means of fusing.

(3) Since the jumper wires 217 are held in advance at positions at which the claw portions 218 can easily be joined to the jumper wires 217, for example, a step in which the commutator 213 is installed on the rotary shaft 111 to which the core 212 has been fixed is performed at a time, by which the coils 216a to 216h and the commutator 213 (the claw portions 218) can be joined to each other. Also, since the deformation of the joint portions between the coils 216a to 216h and the claw portions 218 can be avoided, the reliability of the joint portions can be improved.

Hereunder, a third embodiment embodying the present invention will be described with reference to the accompanying drawings, focusing on points of difference from the first and second embodiments.

Figure 12:
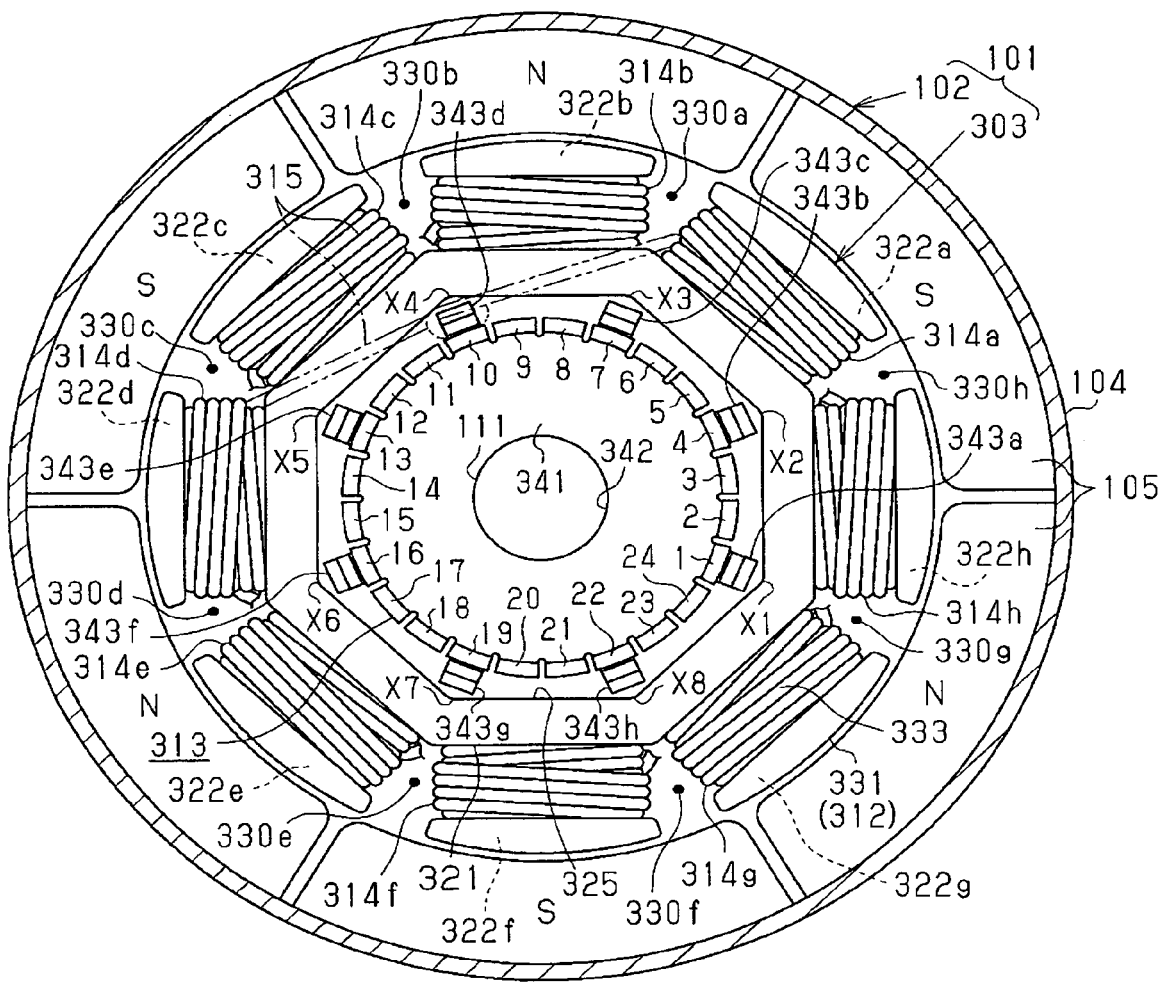
FIG. 12 is a plan cross-sectional view of a motor in accordance with a third embodiment of the present invention.

As shown in FIG. 12, an armature 303 of this embodiment includes the rotary shaft 111, a core 312 fixed on the rotary shaft 111, a commutator 313 also fixed on the rotary shaft 111, and coils 314a to 314h wound on the core 312.

Figure 13:
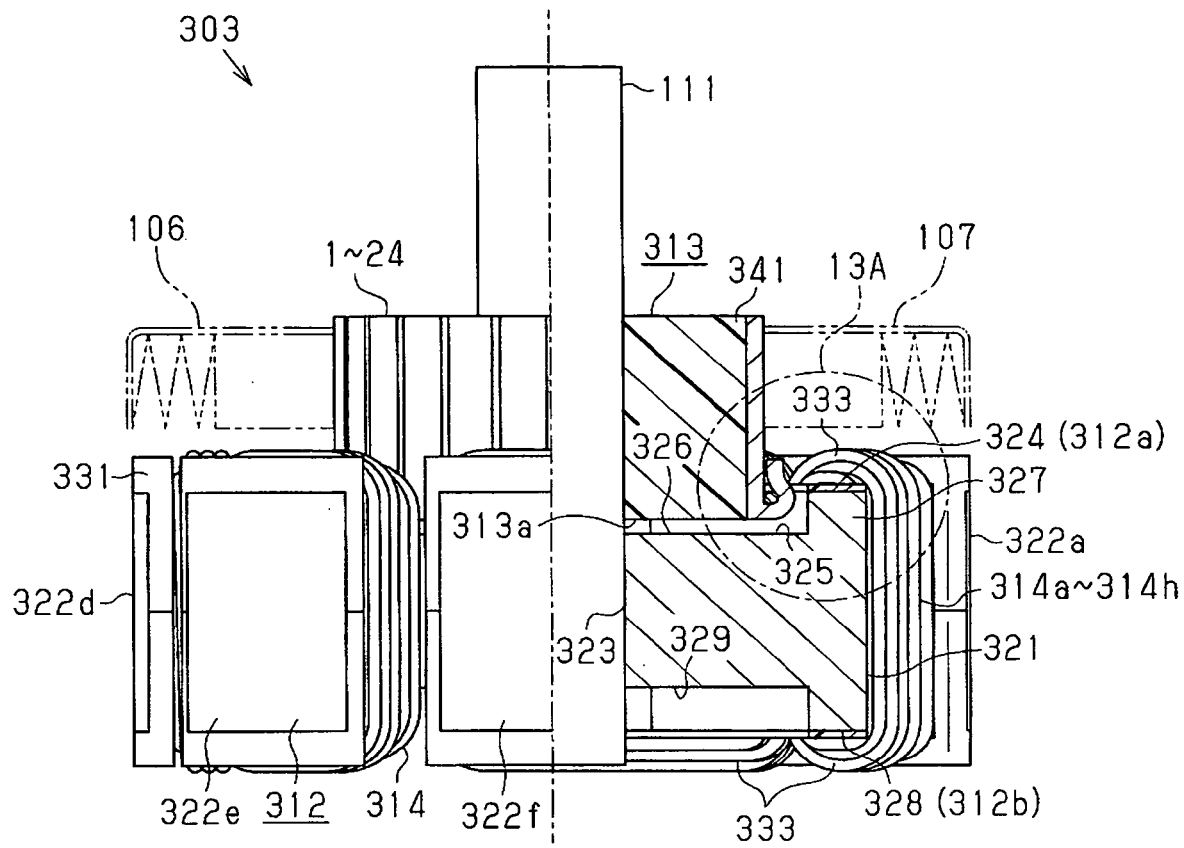
FIG. 13 is a cross-sectional view of an armature provided in the motor shown in FIG. 12.
Figure 13A:
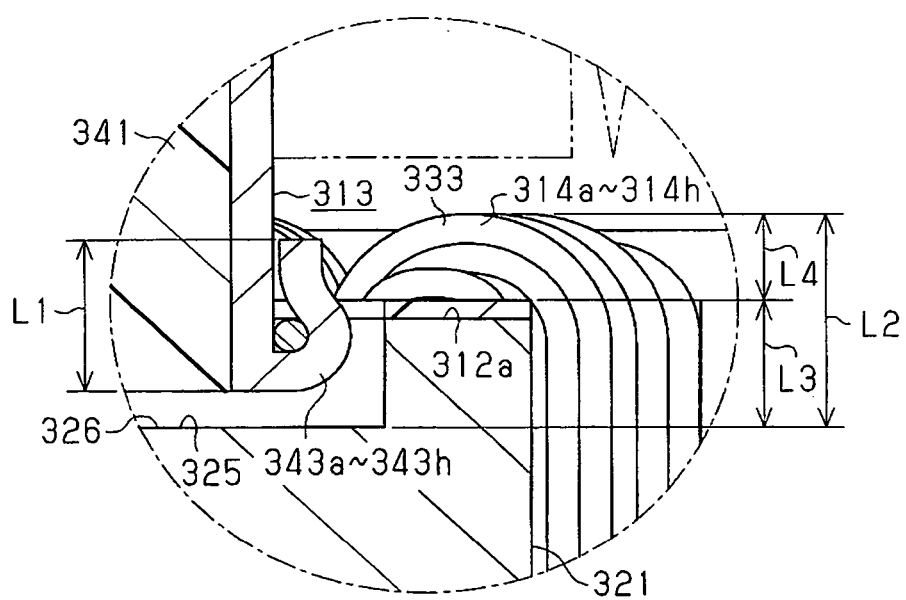
FIG. 13A is an enlarged view of a portion surrounded by circle 13A in FIG. 13.
Figure 14:
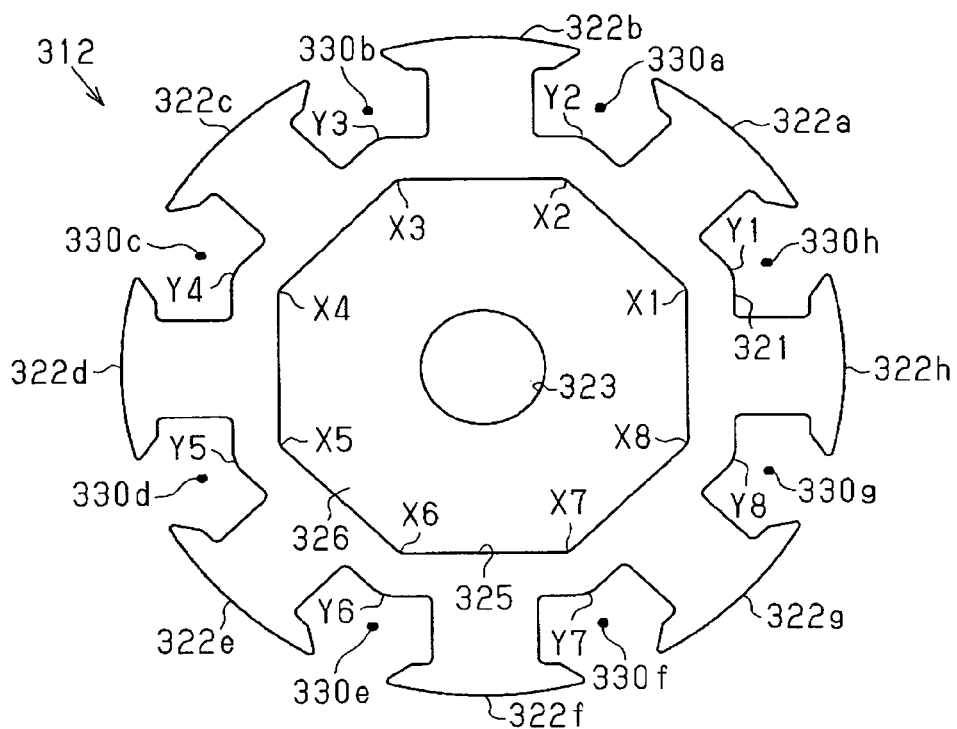
FIG. 14 is a plan view of a core.

As shown in FIG. 14, the core 312 has a body section 321 and a plurality of (eight in this embodiment) tooth sections 322a to 322h. The body section 321 takes a cylindrical shape, and has a shaft insertion hole 323 penetrating in the axial direction. As shown in FIG. 13, the inside diameter of the shaft insertion hole 323 is formed so as to be slightly smaller than the outside diameter of the rotary shaft 111, and the core 312 is fixed on the rotary shaft 111 by press fitting the rotary shaft 111 into the shaft insertion hole 323.

On an end surface 324 of the body section 321 facing the commutator 313, an accommodation hole 325 is formed. The accommodation hole 325 is formed so as to have a regular octagonal shape as viewed in the axial direction (refer to FIG. 14). Also, in the body section 321, the portion ranging from a bottom surface 326 of the accommodation hole 325 to the end surface 324 located on the commutator 313 side forms a side wall portion 327 defining the accommodation hole 325. On an end surface 328 located on the side opposite to the commutator 313 of the body section 321 as well, an adjustment hole 329 having the same shape as that of the accommodation hole 325 is formed.

As shown in FIG. 14, the external shape of the body section 321 (the shape formed by the outer circumference surface of the body section 321) is formed so as to be a regular octagon, as viewed in the axial direction, such as to be consistent with the accommodation hole 325. That is to say, the external shape of the body section 321 is formed so that the circumferential positions of vertexes X1 to X8 of the regular octagon of the accommodation hole 325 coincide with the circumferential positions of vertexes Y1 to Y8 of the regular octagon of the external shape of the body section 321.

On the outer circumference surface of the body section 321, the tooth sections 322a to 322h are formed. Regarding the axial direction of the core 312, the thickness of each of the tooth sections 322a to 322h is equal to the thickness of the body section 321. Also, as viewed in the axial direction, the tooth sections 322a to 322h extend from the central portion in the width direction of each of eight side surfaces forming the outer circumference surface of the body section 321 toward the outside in the radial direction. That is to say, the tooth sections 322a to 322h extend radially from the body section 321. When viewing the core 312 in the axial direction, each of the vertexes X1 to X8 of the regular octagon of the accommodation hole 325 is located in the center between two adjacent tooth sections 322a to 322h.

Between two adjacent tooth sections 322a to 322h, slots 330a to 330h are formed. As shown in FIG. 12, on the tooth sections 322a to 322h, the coils 314a to 314h are wound by way of concentrated winding so as to pass through the slots 330a to 330h via an insulator 331. Each coil 314a to 314h has a coil end portion 333 at each end in the axial direction of the core 312 (refer to FIG. 13). Specifically, each coil end portion 333 is a portion projecting in the axial direction from the insulator 331 (however, the portion having the same thickness as that of the insulator 331 located above the end surface 324 of the body section 321) located above both end surfaces 312a and 312b in the axial direction of the core 312.

The commutator 313 has a cylindrical insulating element 341, and the insulating element 341 has an inner circumference surface formed with a shaft penetrating hole 342 into which the rotary shaft 111 is press fitted. The inside diameter of the shaft penetrating hole 342 is formed so as to be slightly smaller than the outside diameter of the rotary shaft 111, so that the commutator 313 is fixed on the rotary shaft 111 by press fitting the rotary shaft 111 into the shaft penetrating hole 342.

The segments 1 to 24 are fixed on the outer circumference surface of the insulating element 341 so as to extend along the axial direction of the commutator 313. On the outer circumference surface of the insulating element 341, the segments 1 to 24 are arranged at equal angular intervals in the circumferential direction, and a clearance is provided between the adjacent segments 1 to 24.

Of the segments 1 to 24, eight segments 1, 4, 7, 10, 13, 16, 19 and 22 arranged at equal angular intervals in the circumferential direction, namely every third segment, are provided with claw portions (connecting members) 343a to 343h. That is to say, in this embodiment, eight claw portions 343a to 343h having the same number as that of the tooth sections 322a to 322h are provided. Incidentally, the shape of the accommodation hole 325 viewed in the axial direction is formed so that the positions in the circumferential direction of the claw portions 343a to 343h coincide with the positions in the circumferential direction of the vertexes X1 to X8. Furthermore, the accommodation hole 325 is formed so as to have a size capable of accommodating one end portion in the axial direction of the commutator 313 including the claw portions 343a to 343h.

As shown in FIG. 13, the claw portions 343a to 343h are provided so as to extend from end portions of the segments 1, 4, 7, 10, 13, 16, 19 and 22 corresponding to the core 312, and each have a plate shape formed so as to have a width narrower than the width of the segments 1, 4, 7, 10, 13, 16, 19 and 22. The claw portions 343a to 343h are folded toward the end surface of the commutator 313 opposite the end surface facing the core 312, so as to hook the coils 314a to 314h. Thereby, the claw portions 343a to 343h are formed so as to have a shape projecting toward the outside in the radial direction of the commutator 313. The claw portions 343a to 343h are formed so that in a folded state, the length L1 in the axial direction is shorter than the length L2 in the axial direction between the bottom surface 326 of the accommodation hole 325 and the distal ends of the coil end portions 333 located on the side corresponding to the commutator 313. In this embodiment, the distance L2 corresponds to the sum of the depth L3 of the accommodation hole 325 (in FIG. 13, the depth of the accommodation hole 325 means a depth including the thickness of the insulator 331 located above the end surface 324) and the width L4 in the axial direction of each coil end portion 333. To such claw portions 343a to 343h, the coils 314a to 314h are connected.

Figure 15:
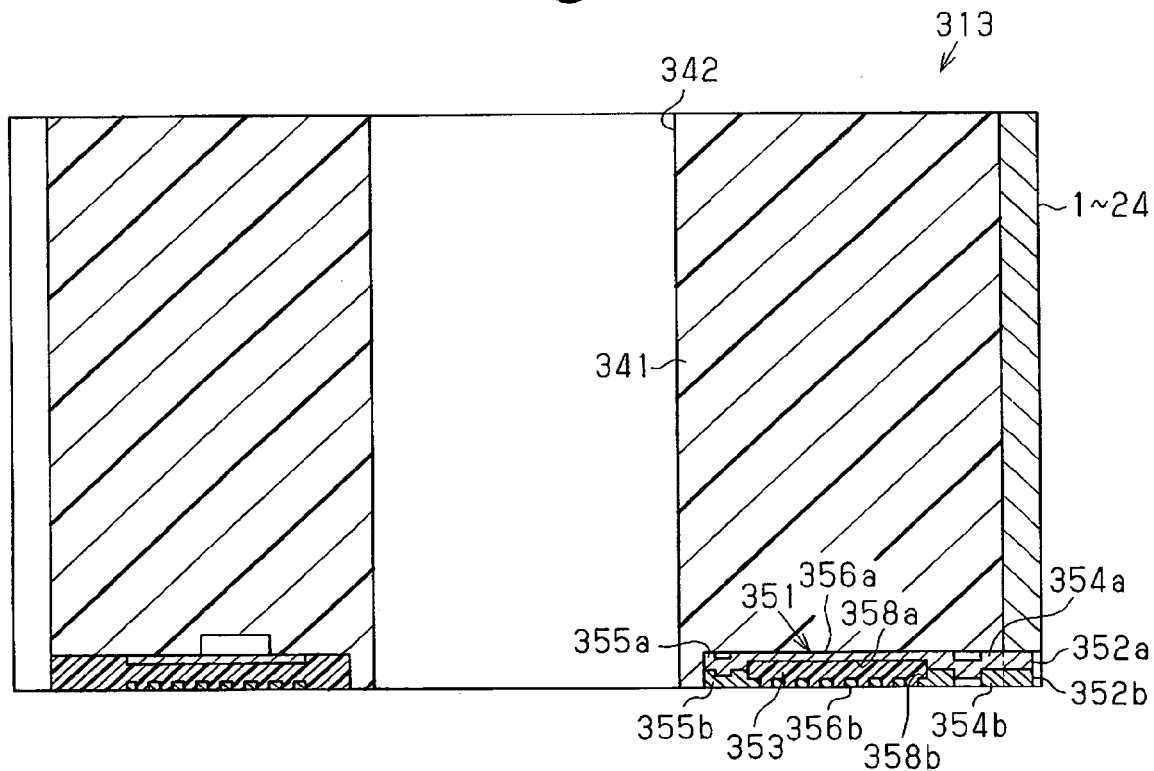
FIG. 15 is a cross-sectional view of a commutator.

As shown in FIG. 15, on the end surface of the insulating element 341 corresponding to the core 312, a short-circuit member assembly 351 is disposed. FIG. 13 shows the commutator 313, omitting the short-circuit member assembly 351. The short-circuit member assembly 351 is an element for short-circuiting two segments that are supposed to have the same potential of the segments 1 to 24 (in this embodiment, every eighth segment) (refer to FIG. 17), and basically has the same configuration as that of the short-circuit member assembly 151 shown in FIG. 6.

Figure 16:
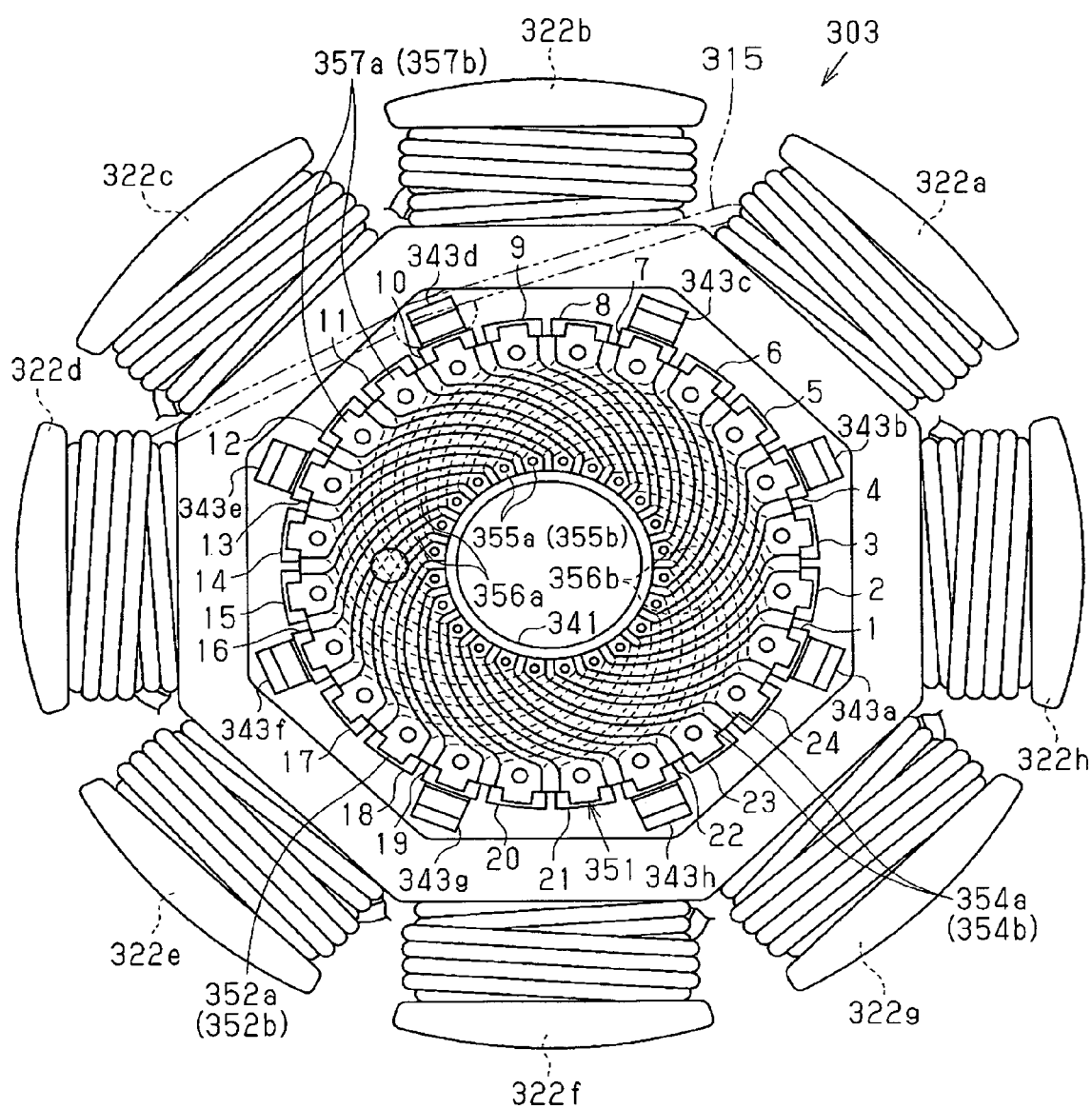
FIG. 16 is a plan view of an armature, showing a short-circuit member assembly.

The short-circuit member assembly 351 includes a first conductive member group 352a and a second conductive member group 352b, which are the same, and an insulating element 353. As shown in FIG. 16, the first conductive member group 352a includes twenty-four first conductive members arranged on one plane, and the second conductive member group 352b includes twenty-four second conductive members arranged on one plane. Each of the first conductive members has an outside terminal 354a located on the outside in the radial direction of the short-circuit member assembly 351, an inside terminal 355a located on the inside in the radial direction of the short-circuit member assembly 351, and a connecting portion 356a extending slantwise with respect to the radial direction of the short-circuit member assembly 351 between the outside terminal 354a and the inside terminal 355a which shift from each other through a predetermined angle in the circumferential direction. Similarly, each of the second conductive members also has an outside terminal 354b located on the outside in the radial direction of the short-circuit member assembly 351, an inside terminal 355b located on the inside in the radial direction of the short-circuit member assembly 351, and a connecting portion 356b extending slantwise with respect to the radial direction of the short-circuit member assembly 351 between the outside terminal 354b and the inside terminal 355b which shift from each other through a predetermined angle in the circumferential direction. The connecting portions 356a, 356b each extend along an involute curve. In this embodiment, the shift angle in the circumferential direction between the outside terminals 354a, 354b and the inside terminals 355a, 355b is 60°, which is equal to an angle by which the terminal shifts by four.

Each of the outside terminals 354a, 354b is formed with an engaging portion 357a, 357b extending to the outside in the radial direction. Also, as shown in FIG. 15, the connecting portions 356a, 356b are formed so as to be thinner than the outside terminals 354a, 354b and the inside terminals 355a, 355b, whereby a step portions 358a, 358b are formed between the connecting portions 356a, 356b and the outside terminals 354a, 354b and between the connecting portions 356a, 356b and the inside terminals 355a, 355b.

Such a conductive member group 352a, 352b is formed by punching a conductive plate-shaped member. Both of the conductive member groups 352a and 352b are laminated in the axial direction so that the inclinations of the connecting portions 356a, 356b with respect to the radial direction of the short-circuit member assembly 351 are reverse in direction. Thereby, each pair of the outside terminals 354a and the outside terminals 354b are brought -into interfacial contact with each other, and each pair of the inside terminals 355a and the inside terminals 355b are brought into interfacial contact with each other. The connecting portions 356a and the connecting portions 356b are made in a non-contact state in the lamination direction by the step portions 358a and 358b. The conductive member groups 352a and 352b are fixed to the commutator 313 by fixing each pair of the engaging portions 357a and the engaging portions 357b, which are lapped on each other, to a corresponding one of the segments 1 to 24.

The insulating element 353 is formed of an insulating resin material, and is arranged between the conductive member groups 352a and 352b. The insulating element 353 fills a gap between the conductive member groups 352a and 352b and a gap between the adjacent conductive members.

As shown in FIG. 13, the commutator 313 configured as described above is fixed on the rotary shaft 111 so that the end portion of the commutator 313 facing the core 312 is accommodated in the accommodation hole 325. Specifically, the commutator 313 is fixed on the rotary shaft 111 so that a part of the each portion 343a to 343h is accommodated in the accommodation hole 325, and the claw portions 343a to 343h are positioned close to the bottom surface 326 of the accommodation hole 325 beyond the distal end of the corresponding coil end portion 333 located on the side corresponding to commutator 313. An end surface 313a of the commutator 313 facing in the axial direction to the core 312 does not come into contact with the bottom surface 326 of the accommodation hole 325.

Next, a manufacturing method for the armature 303 configured as described above will be explained.

Figure 18A:
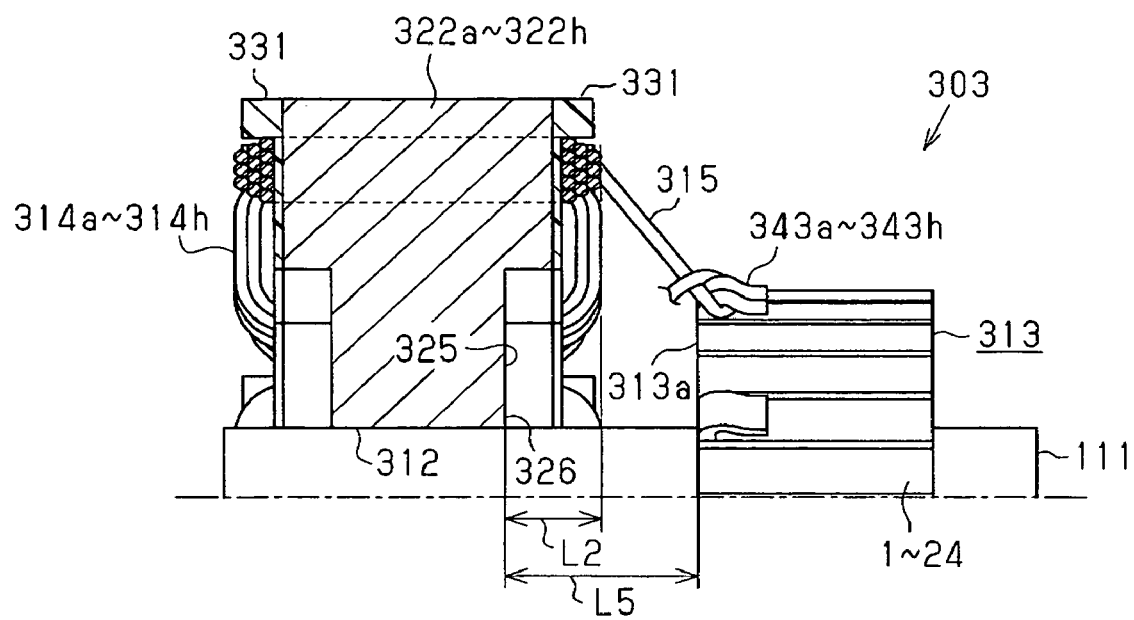
FIGS. 18A and 18B are schematic views for illustrating a manufacturing process for an armature.

First, the core 312 is fixed on the rotary shaft 111 by press fitting the rotary shaft 111 into the shaft insertion hole 323 in the body section 321. Thereafter, the commutator 313 is fixed on the rotary shaft 111 by press fitting the rotary shaft 111 into the shaft penetrating hole 342 in the insulating element 341. As shown in FIG. 18A, the commutator 313 is temporarily fixed on the rotary shaft 111 so that the end portion on the side on which the claw portions 343a to 343h are provided faces in the axial direction to the accommodation hole 325 formed in the body section 321. In this state, on the rotary shaft 111, the commutator 313 is arranged at a position at which the distance L5 between the end surface 313a of the commutator 313 facing in the axial direction to the core 312 and the bottom surface 326 of the accommodation hole 325 is at least two times longer than the distance L2 along the axial direction between the bottom surface 326 of the accommodation hole 325 and the distal end of each coil end portion 333 located on the side corresponding to commutator 313. Incidentally, the position of the distal ends of the coil end portions 333 are measured in advance. In FIG. 18A, on the rotary shaft 111, the commutator 313 is arranged at the position at which the distance L5 is two times longer than the distance L2. In this state, the coils 314a to 314h are wound on the tooth sections 322a to 322h.

Figure 17:
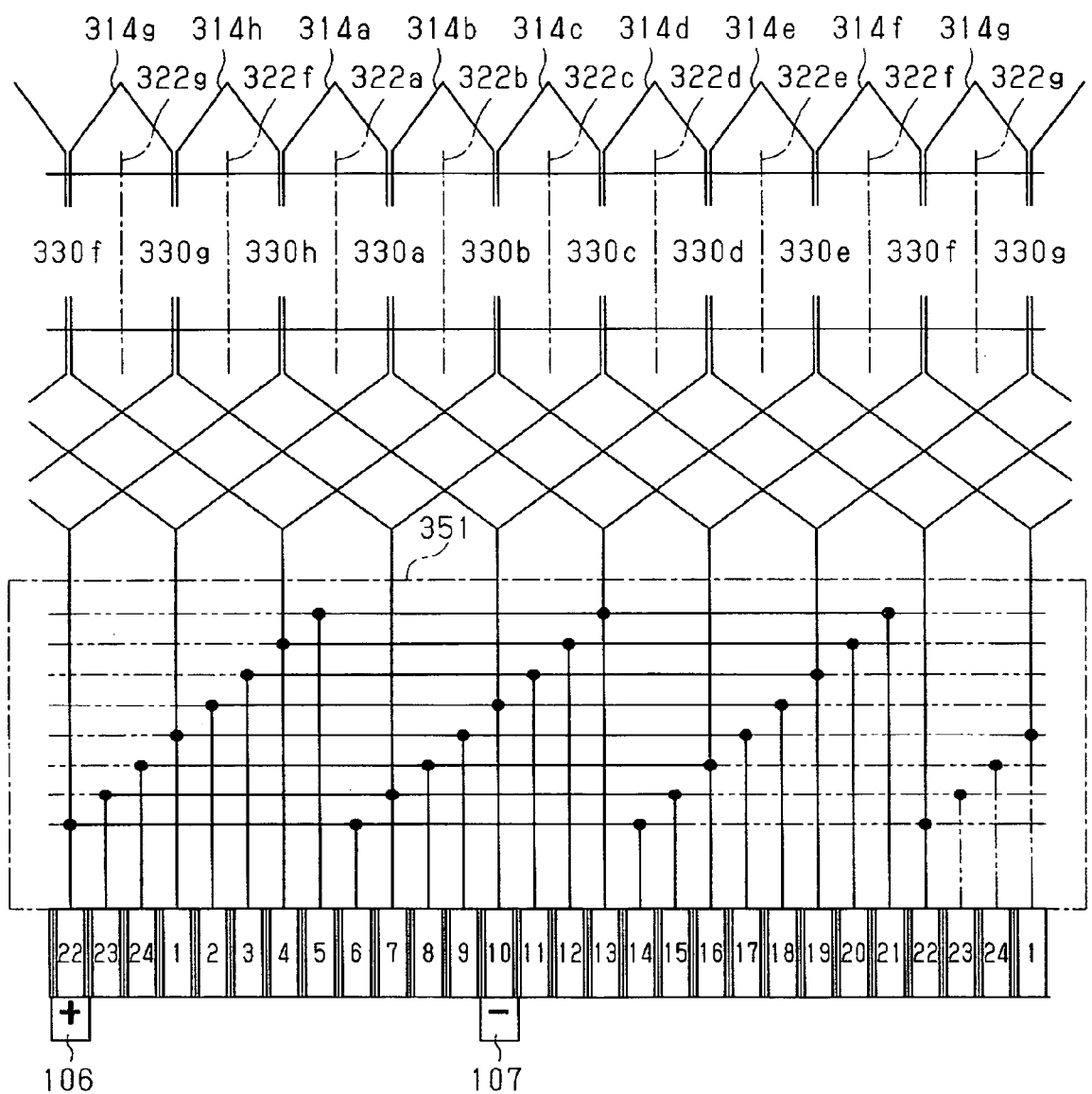
FIG. 17 is a schematic diagram showing a state in which an armature is developed.

That is to say, as shown in FIGS. 12 and 17, first, a conductor forming the coil is hooked to the claw portion 343a formed on the segment 1, being made to pass through the slot 330h located at a position advancing 67.5° in the counterclockwise rotation direction from the claw portion 343a, and is wound a predetermined number of turns on the tooth section 322a located between the slot 330h and the slot 330a. Then, the conductor is made to pass through the slot 330c located at a position advancing 135° in the counterclockwise rotation direction from the slot 330a, and is wound a predetermined number of turns on the tooth section 322d located between the slot 330c and the slot 330d. The conductor forms a jumper wire 315 extending in the circumferential direction (the direction crossing the radial direction) between the slot 330a and the slot 330c so as to pass through the claw portion 343d formed on the segment 10 located at an intermediate position between the slot 330a and the slot 330c, namely, the claw portion 343d located at a position advancing 67.5° in the counterclockwise rotation direction from the slot 330a. This jumper wire 315 is hooked to the claw portion 343d on the way from the slot 330a to the slot 330c.

Thereafter, the conductor is wound on the core 312 in the same way to form the coils. Specifically, the conductor extending from the tooth section 322d, namely, the jumper wire 315 is hooked to the claw portion 343g located at a position advancing 67.5° in the counterclockwise rotation direction from the slot 330d, and is made to pass through the slot 330f located at a position advancing 67.5° in the counterclockwise rotation direction from the claw portion 343g. Then, the conductor is wound a predetermined number of turns on the tooth section 322g located between the slot 330f and the slot 330g. Subsequently, the conductor is hooked to the claw portion 343b located at a position advancing 67.5° in the counterclockwise rotation direction from the slot 330g, and is made to pass through the slot 330a located at a position advancing 67.5° in the counterclockwise rotation direction from the claw portion 343b. Then, the conductor is wound a predetermined number of turns on the tooth section 322b located between the slot 330a and the slot 330b. Subsequently, the conductor is hooked to the claw portion 343e located at a position advancing 67.5° in the counterclockwise rotation direction from the slot 330b, and is made to pass through the slot 330d located at a position advancing 67.5° in the counterclockwise rotation direction from the claw portion 343e. Then, the conductor is wound a predetermined number of turns on the tooth section 322e located between the slot 330d and the slot 330e. Subsequently, the conductor is hooked to the claw portion 343h located at a position advancing 67.5° in the counterclockwise rotation direction from the slot 330e, and is made to pass through the slot 330g located at a position advancing 67.5° in the counterclockwise rotation direction from the claw portion 343h. Then, the conductor is wound a predetermined number of turns on the tooth section 322h located between the slot 330g and the slot 330h. Subsequently, the conductor is hooked to the claw portion 343c located at a position advancing 67.5° in the counterclockwise rotation direction from the slot 330h, and is made to pass through the slot 330b located at a position advancing 67.5° in the counterclockwise rotation direction from the claw portion 343c. Then, the conductor is wound a predetermined number of turns on the tooth section 322c located between the slot 330b and the slot 330c. Subsequently, the conductor is hooked to the claw portion 343f located at a position advancing 67.5° in the counterclockwise rotation direction from the slot 330c, and is made to pass through the slot 330e located at a position advancing 67.5° in the counterclockwise rotation direction from the claw portion 343f. Then, the conductor is wound a predetermined number of turns on the tooth section 322f located between the slot 330e and the slot 330f. Thereafter, the conductor extending from the tooth section 322f is hooked to the claw portion 343a located at a position advancing 67.5° in the counterclockwise rotation direction from the slot 330f.

As described above, the conductor forming the coils 314a to 314h is successively wound (by way of concentrated winding) on all of the tooth sections 322a to 322h while being hooked to the claw portions 343a to 343h. The jumper wires 315 hooked to the claw portions 343a to 343h are joined to the claw portions 343a to 343h by fusing and are hence connected electrically to the claw portions 343a to 343h. The jumper wires 315 correspond to the end portions of the coils 314a to 314h extending from the tooth sections 322a to 322h.

Figure 18B:
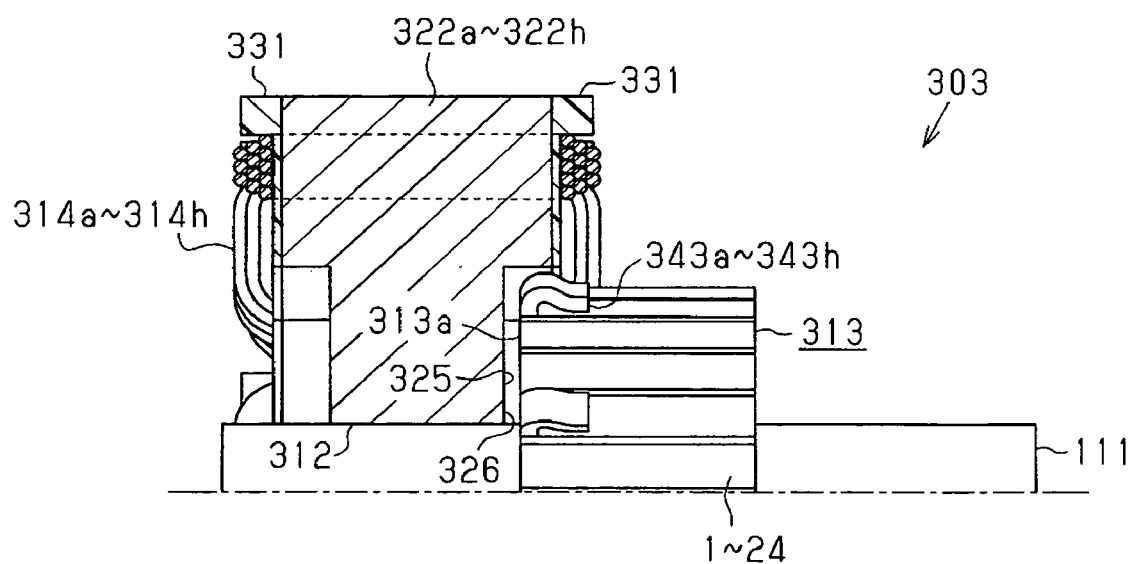

Next, as shown in FIG. 18B, the commutator 313 is again moved on the rotary shaft 111 toward the bottom surface 326 of the accommodation hole 325 so that one end portion in the axial direction facing the core 312 (an end portion in which the claw portions 343a to 343h are provided) is accommodated in the accommodation hole 325. At this time, the commutator 313 is moved to a position immediately before the end surface 313a facing in the axial direction to the core 312 (the surface on the side on which the short-circuit member assembly 351 is disposed) comes into contact with the bottom surface 326 of the accommodation hole 325. Thereby, the end portion of the commutator 313 corresponding to the core 312 is accommodated in the accommodation hole 325, and the claw portions 343a to 343h are arranged close to the bottom surface 326 of the accommodation hole 325 beyond the distal ends of the coil end portions 333. In FIG. 18B, the jumper wire 315 is omitted.

This embodiment described in detail above has the following advantages.

(1) Since the commutator 313 is fixed on the rotary shaft 111 so that one end portion in the axial direction thereof is accommodated in the accommodation hole 325, the size in the axial direction of the armature 303 is decreased. The accommodation hole 325 is formed so as to have a regular octagonal shape, as viewed in the axial direction, such that the positions in the circumferential direction of the vertexes X1 to X8 thereof coincide with the positions in the circumferential direction of the claw portions 343a to 343h. Therefore, the width in the radial direction of the side wall portion 327 between two adjacent claw portions 343a to 343h is wide toward the inside in the radial direction as compared with the case where the accommodation hole 325 is a round hole capable of accommodating the claw portions 343a to 343h. Thereupon, the cross-sectional area along the radial direction of the side wall portion 327 between the-adjacent claw portions 343a to 343h can be made as large as possible. As a result, in the DC motor 101 provided with this armature 303, a decrease in magnetic flux passing through the core 312 (especially, the side wall portion 327) is restrained. This can decrease the size of the armature 303 without a decrease in performance of the DC motor 101, and hence can decrease the size of the DC motor 101 provided with such an armature 303.

(2) The external shape of the body section 321 is formed so as to be regular octagon such that the positions in the circumferential direction of the vertexes X1 to X8 thereof coincide with the positions in the circumferential direction of the vertexes X1 to X8 of the accommodation hole 325. Also, the tooth sections 322a to 322h are each formed in the central portion in the width direction of each of eight side surfaces constituting the outer circumference surface of the body section 321. Therefore, the volume of each slot 330a to 330h increases as compared with the conventional body section having a circular external shape because the portions of the body section 321 located on both sides of the base end portion of each tooth section 322a to 322h is formed into a flat plane shape. As a result, in the case where the number of turns of the coils 314a to 314h is the same as that of the conventional example, the lengths along the radial direction of the tooth sections 322a to 322h can be shortened, so that the size in the radial direction of the DC motor 101 can be decreased. Also, in the case where the outside diameter of the core 312 (the outside diameter including the distance to the distal end of each tooth section 322a to 322h) is the same as that of the conventional example, the number or turns of the coils 314a to 314h can be increased, so that the performance of the DC motor 101 can be improved.

(3) The length L1 in the axial direction of each claw portion 343a to 343h is shorter than the distance L2 along the axial direction between the bottom surface 326 of the accommodation hole 325 and the distal end of each coil end portion 333 located on the side corresponding to the commutator 313. Therefore, the claw portions 343a to 343h can be arranged close to the bottom surface 326 of the accommodation hole 325 beyond the distal ends of he coil end portions 333 located on the side corresponding to the commutator 313. Thereupon, the size in the axial direction of the armature 303 can further be decreased. Also, since the claw portions 343a to 343h do not project from the distal ends of the coil end portions 333 corresponding to the side opposite to the core 312, the brush 106 for power supply on the positive pole side and the brush 107 for power supply on the negative pole side can be brought close to the coil end portions 333 until immediately before the brushes 106 and 107 are brought into contact with the coil end portion 333 located on the side corresponding to the commutator 313. Therefore, the size in the axial direction of the DC motor 101 can be decreased.

(4) When the armature 303 is manufactured, the commutator 313 is fixed at the position at which the distance L5 between the end surface 313a of the commutator 313 facing the core 312 and the bottom surface 326 of the accommodation hole 325 is at least two times longer than the distance L2 along the axial direction between the bottom surface 326 of the accommodation hole 325 and the distal end of the coil end portion 333 located on the side corresponding to the commutator 313. In other words, the commutator 313 is fixed on the rotary shaft 111 so that the distance between the distal end of the coil end portion 333 facing the commutator 313 and the end surface 313a of the commutator 313 facing the core 312 is longer than the distance between the distal end of the coil end portion 333 facing the commutator 313 and the bottom surface 326 of the accommodation hole 325. In this state, the coils 314a to 314h are formed and the jumper wires 315 are connected to the claw portions 343a to 343h. That is to say, in the state in which the length of the conductor between the coil end portion 333 facing the commutator 313 and the claw portion 343a to 343h is longer than the distance at which the claw portion 343a to 343h and the distal end portion 333 facing the commutator 313 are connected to each other in a state in which one end portion in the axial direction of the commutator 313 facing the core 312 is accommodated in the accommodation hole 325, the jumper wires 315 are connected to the claw portions 343a to 343h. Therefore, in the case where one end portion in the axial direction of the commutator 313 facing the core 312 is accommodated in the accommodation hole 325, the jumper wires 315 are prevented from becoming in a tightened state. Thereupon, an accident such that the claw portions 343a to 343h are damaged or the jumper wires 315 are broken by the tightening of the jumper wires 315 can be prevented. As a result, the occurrence of defectives can be restrained. Also, when the DC motor 101 is being operated, the jumper wires 315 can be prevented from being broken.

(5) When the coils 314a to 314h are formed, for example, the conductor is hooked to the claw portion 343d located at the position advancing 67.5° in the counterclockwise rotation direction from the slot 330a after being wound on the tooth section 322a. Then, the conductor is made to pass through the slot 330c located at the position advancing 67.5° in the counterclockwise rotation direction from the claw portion 343d, and is wound on the tooth section 322d located between the slot 330c and the slot 330d. Such a procedure is repeated until all of the coils 314a to 314h are formed. If the coils 314a to 314h are formed in this manner, when the commutator 313 is moved again on the rotary shaft 111 toward the core 312, the jumper wire 315 passing through the claw portions 343a to 343h do not hinder the movement of the commutator 313. In other words, when one end portion of the commutator 313 is accommodated in the accommodation hole 325, the jumper wires 315 are more surely prevented from becoming in a tightened state. By making the jumper wires 315 slightly long so as to have some margin, the jumper wire 315 can further be prevented from becoming in a tightened state.

The above-described embodiments may be modified as described below.

Figure 19:
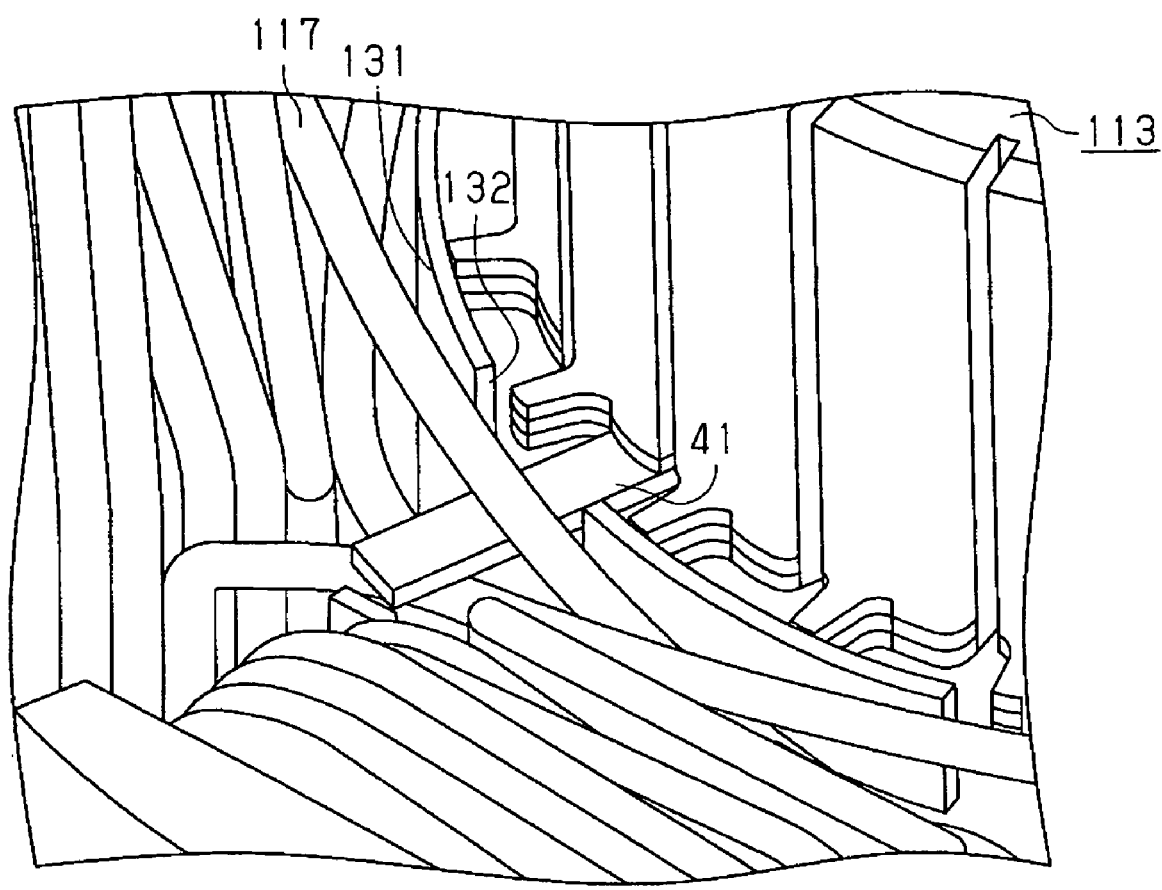
FIG. 19 is a partial perspective view for illustrating a modification of the first embodiment.

In the first embodiment, as shown in FIG. 19, flat claw portions (connecting member) 41 simply extending to the outside in the radial direction may be used. In this case as well, since each claw portion 41 extends to the outside in the radial direction beyond the corresponding guide wall portion 131, the corresponding jumper wire 117 guided by the guide wall portion 131 is naturally arranged on the claw portion 41 in an intermediate portion in the longitudinal direction thereof. The jumper wire 117 and the claw portion 41 may be joined, for example, by laser welding. In this case, the joining work can be performed easily.

In the first embodiment, the eight guide walls 135 including the guide wall portions 131 may be of a substantially octagonal cylindrical shape.

In the first embodiment, the notches 132 in the guide wall 135, the pedestal portions 133, or the positioning wall portions 134 may be omitted. In particular, in the case where the notches 132 are omitted, the claw portions 38 lap in the axial direction on the guide wall portions 131. However, the jumper wire 117 guided by the guide wall portion 131 can be arranged on the claw portion 38.

In the first embodiment, the claw portions 38 may be formed at the outside terminals 33a of the first conductive members, or may be formed integrally with the segments 1 to 24.

In the first embodiment, although the insulating element 32 is arranged between both of the conductive member groups 31a and 31b, the insulating element 32 may be omitted, and only a void may be formed between both of the conductive member groups 31a and 31b.

In the first and second embodiments, the body section 121, 221 of the core 112, 212 and the body cover section 126, 227 of the insulator 114, 115, 214, 215 may be of an annular shape.

In the second embodiment, the insulators 214 and 215 may be omitted.

In the second embodiment, after the coils 214a to 214h have been wound on the tooth sections 222a to 222h, the commutator 213 is mounted on the rotary shaft 111 so that the jumper wires 217 coincide with the claw portions 218. However, the folded elements 218a of the claw portions 218 may be bent in the direction reverse to the direction in the example shown in FIG. 10, namely, toward the side opposite to the core 212. In this case, before the coils 214a to 214h are wound on the tooth sections 222a to 222h, the commutator 213 is mounted on the rotary shaft 111 so that the claw portions 218 are each arranged between two adjacent tooth sections 222a to 222h, and thereafter the coils 214a to 214h are wound on the tooth sections 222a to 222h so that each jumper wire 217 passes through the position of the corresponding claw portion 218. Finally, each jumper wire 217 and the corresponding claw portion 218 are joined to each other by fusing using the jigs 231 and 232. In this case, even when the support force in the axial direction of the commutator 213 with respect to the rotary shaft 111 is weak, the engagement of the jumper wires 217 with the claw portions 218 functions to prevent the commutator 213 from coming off in the axial direction.

In the second embodiment, the number of the arm portions 224 is four, being a half of eight which is the number of the tooth sections 222a to 222h. However, the arm portions 224 have only to be located on the extension in the radial direction of the tooth sections 222a to 222h, and the number thereof may be other than four. That is to say, as shown in FIG. 9, the portion of each jumper wire 217 located on the innermost side in the radial direction is located between two adjacent tooth sections 222a to 222h. This is because the jumper wire 217 passes through two tooth sections. Therefore, each arm portion 224 has only to be located on the extension in the radial direction of one of the teeth portions 222a to 222h located at a position in the circumferential direction such as to avoid the portion of the jumper wire 217 located on the innermost side in the radial direction. For example, if the arm portions 224 are arranged on the extension in the radial direction of all of the tooth sections 222a to 222h, the number of the arm portions 224 is eight, being the same as the number of tooth sections, so that the strength of the core 212 is improved.

In the third embodiment, the length L1 in the axial direction of each claw portion 343a to 343h is a length shorter than the distance L2 along the axial direction between the bottom surface 326 of the accommodation hole 325 and the distal end of each coil end portion 333 located on the side corresponding to the commutator 313. However, the length L1 may be a length other than this.

In the third embodiment, the external shape of the body section 321 is a regular octagon as viewed in the axial direction, which is the same shape as that of the accommodation hole 325. However, the external shape of the body section 321 is not limited to this shape. For example, the external shape of the body section 321 may be a circle as viewed in the axial direction.

In the third embodiment, the commutator 313 is fixed on the rotary shaft 111 so that the claw portions 343a to 343h are located close to the bottom surface 326 of the accommodation hole 325 beyond the distal ends of the coil end portions 333 located on the side corresponding to the commutator 313. However, the commutator 313 has only to be fixed on the rotary shaft 111 so that at least a part of the claw portions 343a to 343h are accommodated in the accommodation hole 325. The claw portions 343a to 343h may project on the side opposite to the core 312 beyond the distal ends of the coil end portions 333 located on the side corresponding to the commutator 313.

In the third embodiment, the accommodation hole 325 is formed into a regular octagonal shape, as viewed in the axial direction, having the vertexes X1 to X8 of the same number as the number of the claw portions 343a to 343h. However, the shape of the accommodation hole 325 is not limited to this shape. For example, the accommodation hole 325 is formed into a polygonal shape, as viewed in the axial direction, having vertexes more than the number of the claw portions 343a to 343h. In this case, each vertex located between two adjacent claw portions 343a to 343h has only to be arranged on the inside in the radial direction as far as possible within the range in which the commutator 313 can be accommodated. Even in such a configuration, the width in the radial direction of the side wall portion 327 between two adjacent claw portions 343a to 343h increases as compared with the case where the accommodation hole 325 is a round hole capable of accommodating the claw portions 343a to 343h. Therefore, the size of the armature 303 can be decreased without degrading the performance of the DC motor 101, and hence the size of the DC motor 101 provided with such an armature 303 can be decreased.

In the third embodiment, before the commutator 313 is mounted on the rotary shaft 111, the coils 314a to 314h are formed in advance. Then, the jumper wires 315 and the claw portions 343a to 343h may be connected electrically to each other by mounting the commutator 313 on the rotary shaft 111 so that the position of the jumper wires 315 coincide with the positions of the claw portions 343a to 343h.

In the above-described embodiments, the number (eight) of the claw portions 38, 41, 218, 343a to 343h is one example, and may be changed arbitrarily. For example, the claw portions may be formed on all of the segments 1 to 24. Also, the number of the claw portions need not be the same as the number of the tooth sections.

In the above-described embodiments, the segments may be short-circuited to each other by using a plurality of short-circuiting lines in place of the substantially flat plate shaped short-circuit member assembly 151, 351.

In the above-described embodiments, the brush 106 for power supply on the positive pole side and the brush 107 for power supply on the negative pole side each may be provided in plural numbers. By doing this, the supply of current to the armature 103, 203, 303 is stabilized.

The motor 101 has only to be a concentrated winding motor in which the number P of magnetic poles is an even number of four or more, the number N of slots is N=P±2 (however, N=6 when P=4), and the number S of segments of commutator is S=N×(P/2). By doing this, the short-pitch winding factor can be increased, so that the DC motor 101 that is advantageous in achieving small size, light weight, and high output can be obtained. The short-pitch winding factor is a factor considering the interval of winding side with respect to the magnetic pole pitch, and is proportional to the output of DC motor. That is to say, the higher the short-pitch winding factor is, the higher the output of DC motor is.

In the above-described embodiments, the coils are wound on the tooth sections by way of concentrated winding. However, the winding system is not limited to this system. For example, the coils may be wound on the tooth sections by way of distributed winding.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

The invention claimed is:

1. An armature comprising:
   a rotary shaft;
   a core fixed on the rotary shaft, the core having a body section and a plurality of tooth sections extending from the body section to an outside in a radial direction and arranged along a circumferential direction of the body section;
   a plurality of coils each provided around one of the tooth sections, the coils being formed by successively winding a conductor on the tooth section with at least one tooth section between each successive windings, such that each portion of the conductor extending between two tooth sections located with at least one tooth section therebetween forms a jumper wire extending in the circumferential direction of the core; and
   a commutator fixed on the rotary shaft, the commutator having a plurality of segments arranged along the circumferential direction of the commutator and a plurality of connecting members projecting to the outside in the radial direction of the commutator, each of the connecting members electrically connecting one of the segments to one of the jumper wires, and being arranged at a position corresponding to one of the jumper wires as viewed in an axial direction of the rotary shaft when the core and the commutator are attached to the rotary shaft; and
   an insulator mounted on the core so that each coil is wound on the corresponding tooth section via the insulator, the insulator having a guide wall for guiding the jumper wires, wherein each connecting member extends to the outside in the radial direction beyond the guide wall, and is connected to an intermediate portion in a longitudinal direction of the corresponding jumper wire.

2. The armature according to claim 1, wherein the guide wall has notches allowing the connecting members to pass through.

3. The armature according to claim 2, wherein the insulator has positioning sections for holding or supporting the connecting members to position the same.

4. The armature according to claim 1, wherein the core has a void portion penetrating in the axial direction, and a portion of each jumper wire connected to the corresponding connecting member is arranged at a position corresponding to the void portion as viewed in the axial direction of the core.

5. The armature according to claim 4, wherein the void portion allows a jig, which is used to join the jumper wires to the connecting members, to pass through.

6. The armature according to claim 1, wherein the segments are divided into a plurality of segment groups, wherein a short-circuit member assembly for short-circuiting a plurality of segments included in each of the segment groups to each other is provided on an end surface of the commutator facing the core, and wherein the connecting members extend from the short-circuit member assembly.

7. An armature comprising:
   a rotary shaft;
   a core fixed on the rotary shaft, the core having a body section and a plurality of tooth sections extending from the body section to an outside in a radial direction and arranged along a circumferential direction of the body section;
   a plurality of coils each provided wound one of the tooth sections, the coils being formed by successively winding a conductor on the tooth sections with at least one tooth section between each successive windings, such that each portion of the conductor extending between two tooth sections located with at least one tooth section therebetween forms a jumper wire extending in the circumferential direction of the core; and
   a commutator fixed on the rotary shaft, the commutator having a plurality of segments arranged along the circumferential direction of the commutator and a plurality of connecting members projecting to the outside in the radial direction of the commutator, each of the connecting members electrically connecting one of the segments to one of the jumper wires, and being arranged at a position corresponding to one of the jumper wires as viewed in an axial direction of the rotary shaft when the core and the commutator are attached to the rotary shaft,
   wherein the connecting members are provided at one end in the axial direction of the commutator, and the body section has an accommodation hole at one end in the axial direction thereof so that the accommodation hole can accommodate the end portion of the commutator on which the connecting members are provided, and wherein the accommodation hole has a polygonal shape as viewed in the axial direction of the body section, and the end portion of the commutator is accommodated in the accommodation hole so that a position in the circumferential direction of each connecting member coincides with a position in the circumferential direction of one of vertexes of the polygonal shape.

8. The armature according to claim 7, wherein the number of the connecting members is the same as the number of the tooth sections, wherein each connecting member is arranged between two adjacent tooth sections in the circumferential direction of the armature, and wherein the number of vertexes of the polygonal shape is the same as the number of the connecting members.

9. The armature according to claim 7, wherein an external shape of the body section is a polygonal shape as viewed in the axial direction of the body section, and the positions in the circumferential direction of vertexes of the polygonal shape in the body section coincide with the positions in the circumferential direction of vertexes of the accommodation hole.

10. The armature according to claim 7, wherein each coil has a coil end portion at both ends in the axial direction of the core, and a dimension of each connecting member in the axial direction of the commutator is smaller than a distance in the axial direction of the core from a bottom surface of the accommodation hole to a distal end of each coil end portion on the side corresponding to the commutator.

11. A DC motor comprising:
a rotary shaft;
a core fixed on the rotary shaft, the core having a body section and eight tooth sections extending from the body section to an outside in a radial direction and arranged along a circumferential direction of the body section;
a plurality of coils each provided around one of the tooth sections, the coils being formed by successively winding a conductor on the tooth sections with two tooth sections between each successive windings, such that each portion of the conductor extending between two tooth sections located with two tooth sections therebetween forms a jumper wire extending in the circumferential direction of the core;
a commutator fixed on the rotary shaft, the commutator having twenty-four segments arranged at equal angular intervals along the circumferential direction of the commutator and a plurality of connecting members projecting to the outside in the radial direction of the commutator and arranged at equal angular intervals along the circumferential direction of the commutator, the segments being divided into a plurality of segment groups, each of the segment groups including three segments arranged at 120° intervals, and each connecting member corresponding to one of the segment groups and electrically connecting one of the segments included in the corresponding segment group to one of the jumper wires, and each connecting member being arranged at a position corresponding to one of the jumper wires as viewed in an axial direction of the rotary shaft when the core and the commutator are attached to the rotary shaft;
a short-circuit member assembly for short-circuiting three segments included in each of the segment groups to each other, the short-circuit member assembly being provided on an end surface of the commutator facing the core; and
a magnetic pole body having six magnetic poles, the magnetic pole body being provided around the core.

12. The DC motor according to claim 11, further comprising an insulator mounted on the core, wherein each coil is wound on the corresponding tooth section via the insulator, the insulator having a guide wall for guiding the jumper wires, and wherein each connecting member extends to the outside in the radial direction beyond the guide wall, and is connected to an intermediate portion in a longitudinal direction of the corresponding jumper wire.

* * * * *

UNITED STATES PATENT AND TRADEMARK OFFICE
CERTIFICATE OF CORRECTION

| | | |
|---|---|---|
| PATENT NO. | : 7,550,893 B2 | Page 1 of 1 |
| APPLICATION NO. | : 11/338609 | |
| DATED | : June 23, 2009 | |
| INVENTOR(S) | : Aoyama et al. | |

It is certified that error appears in the above-identified patent and that said Letters Patent is hereby corrected as shown below:

Column 26, line 44, delete "wound" and insert therefor --around--.

Signed and Sealed this

Eleventh Day of August, 2009

David J. Kappos
*Director of the United States Patent and Trademark Office*